United States Patent
Wiley et al.

(10) Patent No.: US 11,681,100 B2
(45) Date of Patent: Jun. 20, 2023

(54) MULTI-AXIS POSITIONER

(71) Applicant: 3SAE Technologies, Inc., Franklin, TN (US)

(72) Inventors: Robert Wiley, Franklin, TN (US); Brett Clark, Whites Creek, TN (US)

(73) Assignee: 3SAE TECHNOLOGIES, INC., Franklin, TN (US)

( * ) Notice: Subject to any disclaimer, the term of this patent is extended or adjusted under 35 U.S.C. 154(b) by 133 days.

(21) Appl. No.: 17/029,908

(22) Filed: Sep. 23, 2020

(65) Prior Publication Data

US 2021/0003779 A1 Jan. 7, 2021

Related U.S. Application Data

(60) Continuation-in-part of application No. 16/930,638, filed on Jul. 16, 2020, now Pat. No. 11,269,143,
(Continued)

(51) Int. Cl.
| | |
|---|---|
| *G02B 6/25* | (2006.01) |
| *G02B 6/255* | (2006.01) |
| *F16M 11/04* | (2006.01) |
| *F16M 11/12* | (2006.01) |
| *F16M 11/32* | (2006.01) |

(Continued)

(52) U.S. Cl.
CPC ......... *G02B 6/2555* (2013.01); *F16M 11/041* (2013.01); *F16M 11/12* (2013.01); *F16M 11/18* (2013.01); *F16M 11/32* (2013.01); *G02B 6/2553* (2013.01); *G02B 6/3616* (2013.01)

(58) Field of Classification Search
CPC .. G02B 6/255; G02B 6/2555; G02B 6/25533; G02B 6/3616; F16M 11/041; F16M 11/12; F16M 11/18; F16M 11/32
See application file for complete search history.

(56) References Cited

U.S. PATENT DOCUMENTS

| | | |
|---|---|---|
| 3,288,421 A | 11/1966 | Peterson |
| 3,871,778 A | 3/1975 | Schulte et al. |
| | (Continued) | |

FOREIGN PATENT DOCUMENTS

| | | |
|---|---|---|
| CN | 1492252 | 4/2004 |
| CN | 201438227 | 4/2010 |
| | (Continued) | |

OTHER PUBLICATIONS

Office Action dated Mar. 25, 2021 issued in corresponding European Application No. 17857487.7.
(Continued)

*Primary Examiner* — Peter Radkowski
(74) *Attorney, Agent, or Firm* — Onello & Mello, LLP

(57) ABSTRACT

A multi-axis positioning stage or positioner includes a top plate supported and manipulatable by a plurality of prismatic joint actuators. Each actuator includes an actuator joint having four or five Degrees of Freedom (DOF) with the top plate. When one or more of the actuators extends or contracts, the pivot points, or four or five DOF actuator joints, of the remaining actuators are allowed to shift to move the top plate. The actuators can be disposed between at least one base plate or base structure, and can be fixed thereto.

20 Claims, 25 Drawing Sheets

Related U.S. Application Data which is a continuation of application No. 16/275,601, filed on Feb. 14, 2019, now Pat. No. 10,746,928, which is a division of application No. 15/720,006, filed on Sep. 29, 2017, now Pat. No. 10,429,587.

(60) Provisional application No. 62/402,674, filed on Sep. 30, 2016.

(51) Int. Cl.
*F16M 11/18* (2006.01)
*G02B 6/36* (2006.01)

(56) References Cited

U.S. PATENT DOCUMENTS

| | | |
|---|---|---|
| 4,142,776 A | 3/1979 | Cherin et al. |
| 4,396,247 A | 8/1983 | Simon et al. |
| 4,773,727 A | 9/1988 | Le Pivert et al. |
| 4,911,522 A | 3/1990 | Iwamoto et al. |
| 4,971,422 A | 11/1990 | Herse |
| 5,114,300 A | 5/1992 | Shahinpoor et al. |
| 5,168,221 A | 12/1992 | Houston |
| 5,168,617 A | 12/1992 | Tsuchida et al. |
| 5,279,176 A | 1/1994 | Tahmasebi et al. |
| 5,303,035 A | 4/1994 | Luecke et al. |
| 5,487,125 A | 1/1996 | Kammlott et al. |
| 5,614,918 A | 3/1997 | Dinardo et al. |
| 5,656,905 A | 8/1997 | Tsai |
| 5,752,834 A | 5/1998 | Ling |
| 5,754,582 A | 5/1998 | Dong |
| 5,859,947 A | 1/1999 | Kiryuscheva et al. |
| 5,905,829 A | 5/1999 | Maenishi et al. |
| 5,962,949 A | 10/1999 | Dhuler et al. |
| 5,986,827 A | 11/1999 | Hale |
| 6,079,169 A | 6/2000 | Ashworth |
| 6,135,683 A | 10/2000 | Kim et al. |
| 6,174,092 B1 | 1/2001 | Siala |
| 6,402,329 B1 | 6/2002 | Bailly et al. |
| 6,457,864 B1 | 10/2002 | Chang et al. |
| 6,479,548 B2 | 11/2002 | Patterson et al. |
| 6,498,892 B1 | 12/2002 | Harman |
| 6,555,983 B1 | 4/2003 | Davies |
| 6,603,239 B1 | 8/2003 | Michely et al. |
| 6,612,754 B2 | 9/2003 | Dahmani et al. |
| 6,690,864 B1 | 2/2004 | Dee et al. |
| 6,765,733 B1 | 7/2004 | Igl et al. |
| 6,786,649 B2 | 9/2004 | Sherrer |
| 6,842,994 B2 | 1/2005 | McInroy |
| 6,871,548 B2 | 3/2005 | Helmer et al. |
| 6,873,478 B2 | 3/2005 | Watson |
| 6,905,259 B2 | 6/2005 | Smith et al. |
| 6,964,288 B2 | 11/2005 | Christopher et al. |
| 6,975,799 B2 | 12/2005 | Kim et al. |
| 7,068,891 B1 | 6/2006 | Cook et al. |
| 7,070,342 B2 | 7/2006 | Bush et al. |
| 7,242,537 B2 | 7/2007 | Weber et al. |
| 7,275,332 B2 | 10/2007 | Blanding |
| 7,371,020 B2 | 5/2008 | Kanda et al. |
| 7,407,333 B2 | 8/2008 | Horino et al. |
| 7,522,323 B2 | 4/2009 | Clube |
| 7,568,854 B2 | 8/2009 | McMurtry |
| 7,656,075 B2 | 2/2010 | Voigtlaender et al. |
| 7,706,922 B2 | 4/2010 | Ueno et al. |
| 7,878,470 B2 | 2/2011 | Oh et al. |
| 8,179,621 B2 | 5/2012 | Muehlbeyer et al. |
| 8,227,674 B2 | 7/2012 | Brown |
| 8,333,766 B2 | 12/2012 | Edelhauser et al. |
| 8,624,967 B2 | 1/2014 | O'Connell et al. |
| 8,752,283 B2 | 6/2014 | Barwicz et al. |
| 8,886,287 B2 | 11/2014 | Larson et al. |
| 8,886,331 B2 | 11/2014 | Labadie et al. |
| 8,900,009 B2 | 12/2014 | Hornick et al. |
| 8,956,068 B2 | 2/2015 | Mekid et al. |
| 9,103,994 B2 | 8/2015 | Jones et al. |
| 9,146,360 B2 | 9/2015 | Chen |
| 9,234,561 B2 | 1/2016 | Laurens |
| 9,364,925 B2 | 6/2016 | Barwicz et al. |
| 9,694,455 B2 | 7/2017 | Brown et al. |
| 9,773,601 B2 | 9/2017 | Breiwa et al. |
| 9,783,133 B2 | 10/2017 | Huelke et al. |
| 9,944,217 B2 | 4/2018 | Schroeder et al. |
| 10,416,391 B2 | 9/2019 | Froggatt et al. |
| 10,429,587 B2 | 10/2019 | Wiley et al. |
| 10,739,529 B2 | 8/2020 | Froggatt et al. |
| 10,746,928 B2 | 8/2020 | Wiley et al. |
| 2001/0055449 A1 | 12/2001 | Sherrer |
| 2002/0009271 A1 | 1/2002 | Herve et al. |
| 2002/0015568 A1 | 2/2002 | Dahmani et al. |
| 2002/0032218 A1 | 3/2002 | Patterson et al. |
| 2002/0176683 A1* | 11/2002 | Harman ............... G02B 6/4226 385/52 |
| 2003/0007774 A1 | 1/2003 | Christopher et al. |
| 2003/0061699 A1 | 4/2003 | Appleby et al. |
| 2003/0106230 A1* | 6/2003 | Hennessey ........... H02N 2/0095 33/645 |
| 2003/0123808 A1 | 7/2003 | Smith et al. |
| 2003/0196314 A1 | 10/2003 | Appleby et al. |
| 2003/0234917 A1 | 12/2003 | Watson |
| 2004/0013509 A1* | 1/2004 | Roy ..................... B23Q 1/5462 414/735 |
| 2004/0028338 A1 | 2/2004 | Dee et al. |
| 2004/0052470 A1 | 3/2004 | Kim et al. |
| 2004/0093753 A1 | 5/2004 | McInroy |
| 2004/0179794 A1 | 9/2004 | Horino et al. |
| 2004/0190838 A1 | 9/2004 | Bush et al. |
| 2004/0255696 A1 | 12/2004 | Helmer et al. |
| 2005/0230052 A1 | 10/2005 | Christopher et al. |
| 2005/0276550 A1 | 12/2005 | Kanda et al. |
| 2006/0007563 A1 | 1/2006 | Weber et al. |
| 2006/0186285 A1 | 8/2006 | Blanding |
| 2007/0024938 A1 | 2/2007 | Clube |
| 2007/0035856 A1* | 2/2007 | Galpin .................. G02B 7/004 359/819 |
| 2007/0052301 A1 | 3/2007 | Muehlbeyer et al. |
| 2007/0091397 A1 | 4/2007 | Clube |
| 2007/0125917 A1 | 6/2007 | Oh et al. |
| 2007/0231061 A1 | 10/2007 | McMurtry |
| 2007/0279851 A1 | 12/2007 | Oh et al. |
| 2008/0039973 A1 | 2/2008 | Ueno et al. |
| 2008/0204551 A1 | 8/2008 | O'Connell et al. |
| 2009/0009033 A1 | 1/2009 | Voigtlaender et al. |
| 2010/0069740 A1 | 3/2010 | Larson et al. |
| 2010/0157270 A1 | 6/2010 | Muehlbeyer et al. |
| 2010/0234844 A1 | 9/2010 | Edelhauser et al. |
| 2011/0094364 A1 | 4/2011 | Brown |
| 2011/0319913 A1 | 12/2011 | Labadie et al. |
| 2012/0168593 A1 | 7/2012 | Mekid et al. |
| 2012/0282052 A1 | 11/2012 | Boria |
| 2013/0068915 A1 | 3/2013 | Yang |
| 2013/0078855 A1 | 3/2013 | Hornick et al. |
| 2013/0085531 A1 | 4/2013 | Hartman et al. |
| 2013/0195416 A1 | 8/2013 | Jones et al. |
| 2013/0283584 A1 | 10/2013 | Barwicz et al. |
| 2013/0283591 A1 | 10/2013 | Barwicz et al. |
| 2013/0299669 A1 | 11/2013 | Laurens |
| 2013/0304087 A1* | 11/2013 | Stuart .................. B25J 17/0266 901/19 |
| 2014/0145059 A1 | 5/2014 | Anderson et al. |
| 2014/0150593 A1 | 6/2014 | Brown et al. |
| 2014/0151947 A1 | 6/2014 | Brown et al. |
| 2014/0374564 A1 | 12/2014 | Schroeder et al. |
| 2015/0239082 A1 | 8/2015 | Krouglicof et al. |
| 2016/0068117 A1 | 3/2016 | Huelke et al. |
| 2016/0082647 A1 | 3/2016 | Amro et al. |
| 2016/0259374 A1 | 9/2016 | Breiwa et al. |
| 2018/0095223 A1 | 4/2018 | Wiley et al. |
| 2018/0172920 A1 | 6/2018 | Froggatt et al. |

(56) References Cited

U.S. PATENT DOCUMENTS

2019/0179080 A1 6/2019 Wiley et al.
2019/0391341 A1 12/2019 Froggatt et al.

FOREIGN PATENT DOCUMENTS

| CN | 201984183 | | 9/2011 | |
|---|---|---|---|---|
| DE | 19715226 | | 10/1998 | |
| ES | 2320064 | A1 * | 5/2009 | ........... F16K 27/067 |
| FR | 2964337 | | 3/2012 | |
| JP | 64505 | | 1/1989 | |
| JP | 0351792 | | 3/1991 | |
| JP | 3608125 | B2 * | 1/2005 | |
| JP | 2008136521 | A * | 6/2008 | |
| WO | 2018064462 | | 4/2018 | |

OTHER PUBLICATIONS

International Search Report and Written Opinion dated Dec. 23, 2021 issued in corresponding International Application No. PCT/US2021/051234.
Almonacid et al., "Motion Planning of a Climbing Parallel Robot", IEEE Transactions on Robotics and Automation, V. 19, No. 3, Jun. 2003.
Bai et al., "Direct Field-Feedback Control of a Ball-Joint-Like Permanent-Magnet Spherical Motor", IEEE/ASME Transactions on Mechatronics, vol. 19, No. 3, Jun. 2014.
Bayani et al., "Design of Hyper Redundant Robot Using Ball Screw Mechanism Approach", 2015 IEEE International Conference on Advanced Intelligent Mechatronics (AIM), Jul. 7-11, 2015, Busan, Korea.
Extended European Search Report dated Apr. 17, 2020 issued in corresponding European Application No. 17857487.7.
International Search Report and Written Opinion dated Dec. 7, 2017, issued in corresponding International Application No. PCT/US17/54272.
Masao Tachikura, "Fusion mass-splicing for optical fibers using electric discharges between two pairs of electrodes", Appl. Opt. 23, 492-498 (1984).
PI, Fiber Positioners, Catalogue, 2012.
Slocum, Alexander. "Linkages", MIT, Jan. 1, 2008, available at https://web.mit.edu/2.75/fundamentals/FUNdaMENTALs%20Book%20pdf/FUNdaMENTALs%20T.
Chinese Office Action and Search Report dated Dec. 24, 2021 issued in corresponding Chinese Application No. 201780070876.5.
Japanese Office Action dated Aug. 17, 2021 issued in corresponding Japanese Application No. 2019-517816, with machine translation to English.
Chinese Office Action dated Jul. 15, 2022 issued in corresponding Chinese Application No. 201780070876.5, with English translation.
Office Action dated Sep. 30, 2022 issued in corresponding European Application No. 17857487.7.
Excerpts from Chase, Kenneth & Gao, Jinsong & Magleby, Spencer & Sorensen, Carl. (2000). Including Geometric Feature Variations in Tolerance Analysis of Mechanical Assemblies. II E Transactions (Institute of Industrial Engineers). 28. 10.1080/15458830.1996.11770732.(Year: 2000).
Excerpts from http://ecoursesonline.iasri.res.in/mod/page/view.php?id=1305(Year: 2014).
Rasakatla et al. "RAMA-1 highly dexterous 48DOF robotic hand using magnetic spherical joints," 2013 IEEE International Conference on Robotics and Biomimetics (ROBIO), Shenzhen, China, 2013, pp. 816-823, doi: 10.1109/ROBIO .2013.6739563. (Year: 2013).

\* cited by examiner

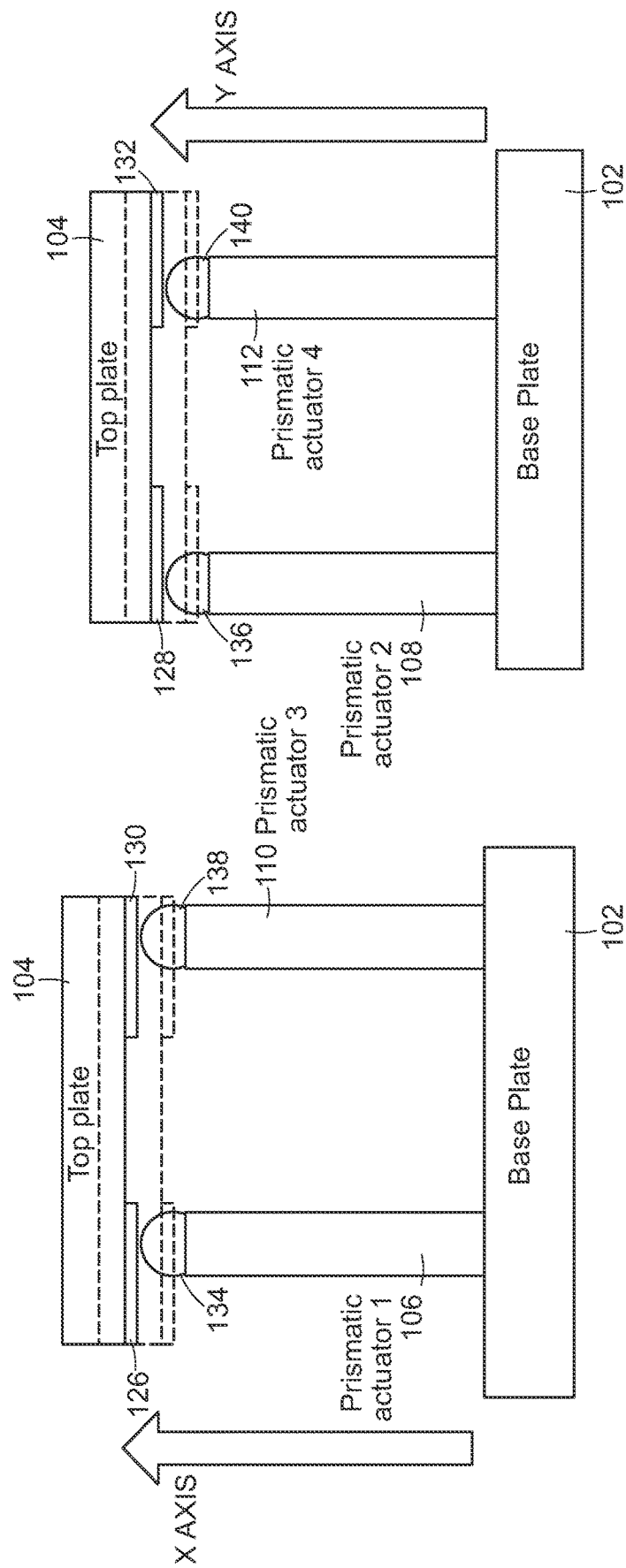

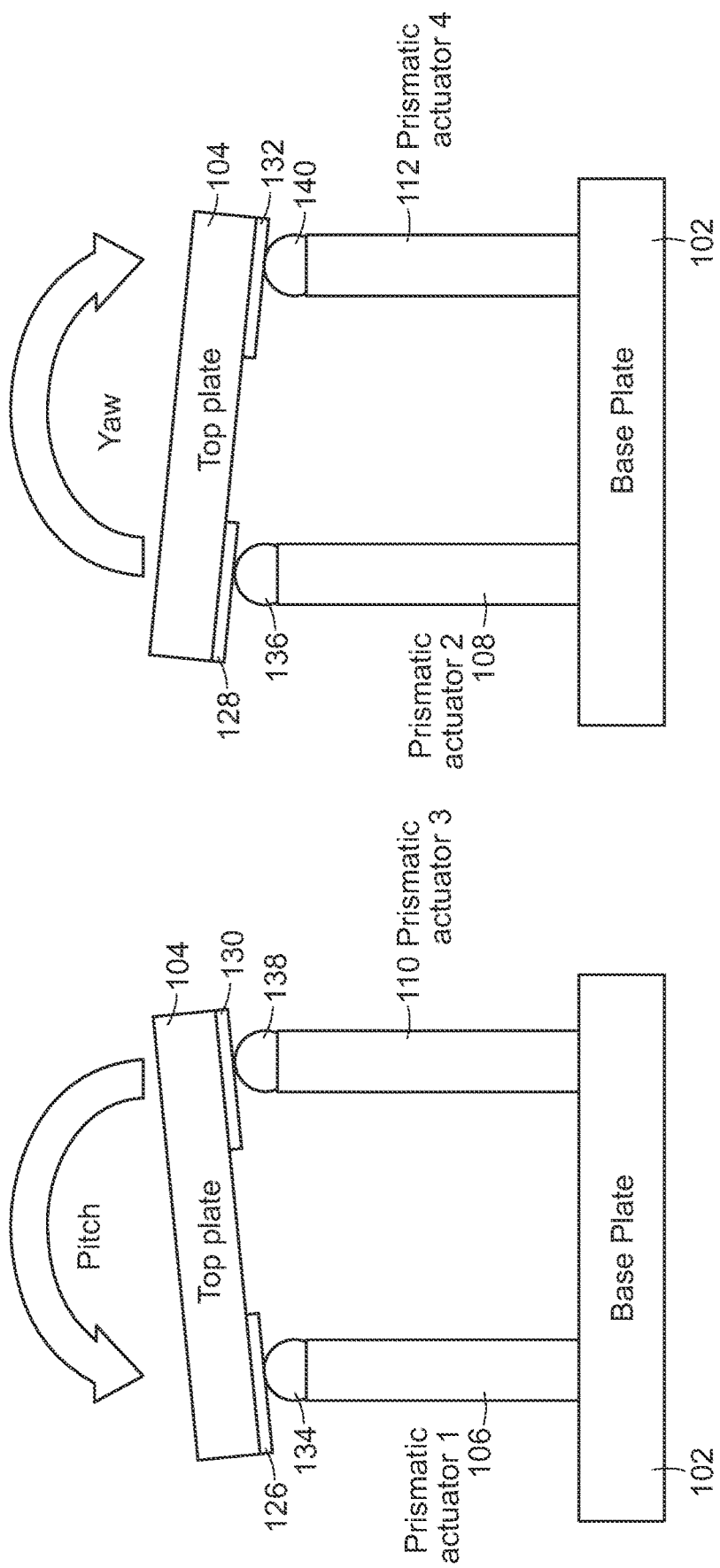

|  | Actuator 1 | Actuator 2 | Actuator 3 | Actuator 4 |
|---|---|---|---|---|
| X+ | Extend | | Extend | |
| Y+ | | Extend | | Extend |
| X- | Retract | | Retract | |
| Y- | | Retract | | Retract |
| Pitch + | Extend | Extend | | |
| Yaw + | | | Extend | Retract |
| Pitch - | Retract | Retract | | |
| Yaw - | | | Retract | Extend |

FIG. 10

|  | Actuator 1 | Actuator 2 | Actuator 3 | Actuator 4 | Actuator 5 |
|---|---|---|---|---|---|
| Z+ | | | | | Extend |
| Z- | | | | | Retract |

FIG. 11

MULTI-AXIS POSITIONER

RELATED APPLICATIONS

This application is a continuation-in-part of U.S. patent application Ser. No. 16/930,638 filed Jul. 16, 2020 and entitled MULTI-AXIS POSITIONER, which is a continuation of U.S. application Ser. No. 16/275,601, filed on Feb. 14, 2019 and entitled MULTI-AXIS POSITIONING METHOD, now U.S. Pat. No. 10,746,928, which is a divisional of U.S. patent application Ser. No. 15/720,006, filed on Sep. 29, 2017 and entitled MULTI-AXIS RELATIVE POSITIONING STAGE, now U.S. Pat. No. 10,429, 587, which claims benefit of U.S. Provisional Application No. 62/402,674, filed on Sep. 30, 2016, and entitled MULTI-AXIS RELATIVE POSITIONING STAGE, each of which is incorporated herein by reference in its entirety.

FIELD OF INTEREST

Inventive concepts relate to a positioning stage and, in particular, to a multi-axis relative positioning stage.

BACKGROUND

Position manipulators are employed in a vast array of applications to position objects, tool, or instruments with varying degrees of precision. A survey of kinematic joints, or kinematic pairs, that may be used in position manipulators are illustrated in FIG. 1, including: rigid (no motion), prismatic, revolute, parallel cylinders, cylindrical, spherical, planar, edge slider, cylindrical slider, point slider, spherical slider, and crossed cylinder.

The Stewart Platform (also referred to herein as a hexapod) is a multi-axis positioning stage made up of six actuators with spherical, ball, or universal joints at both ends of each actuator, for example. Hexapods are considered the world class multi-axis positioning stage design for most applications, but are often cost-prohibitive. One problem with hexapods is that it is a synergistic motion platform because of the mutual interaction of the actuators. That is, due to the mutual interaction of the actuators, none of the actuators can be moved independently; a given move requires many or all of the actuators to move over different specific amounts and at different speed profiles to prevent the stage from binding. Additionally, these motion and speed profiles change continuously as the defined starting and ending points are changed. For this reason, a highly complex computer algorithm is required to individually calculate the distance to travel and speed profiles necessary for each actuator to get the top plate of the stage from point A to point B, even if a short distance single axis move is desired. As a result, a human operator is incapable of manually performing, even this simple move, without binding the stage.

Another significant disadvantage with a hexapod is that the stiffness of the joints (against off axis motion) dictates the "slop," or "play," and, therefore, the resolution of the stage. This is a design conflict because it is exponentially more difficult to make spherical joints (employed in hexapods) at tighter and tighter tolerances. That is, in the case where a designer makes a world class spherical bearing to maximize stage resolution and minimize slop, he has, by default, exacerbated two inherent issues. First, because of the rigidness of the spherical joints, the accuracy of the motion and speed profile requirements for each actuator increases exponentially to prevent binding. Second, the capability requirements of the actuators increases exponentially in order to achieve the required precision motions and speed profiles. As a result, improving the resolution of a hexapod requires an exponential increase in computing power for determining motion and speed profiles, an exponential increase in the performance capabilities of the actuators, and twelve high quality spherical bearings. All of these factors drive up the cost of a hexapod significantly.

Although hexapods typically cost from three to ten times as much as their kinematic chain counterpart, they are often preferred because they do not suffer from tolerance stack up issues. Ten microns of precision is not an uncommon positioner requirement for many applications and, for example, in the photonics industry, submicron precision is often required. At this date, hexapods typically cost from $60,000 to greater than $120,000, each depending on physical size, load limits, and precision requirements. An alternative precise position manipulator would be highly desirable.

SUMMARY

In accordance with principles of inventive concepts, a parallel position manipulator includes a top plate, a base plate (also referred to herein as a bottom plate or baseplate) and three, four, five or six prismatic joint actuators. Each actuator includes an actuator joint having five Degrees of Freedom (DOF) at either the base plate or the top plate. In operation, when one or more of the actuators extends or contracts the pivot points, e.g., five DOF actuator joints, of the remaining actuators are allowed to shift in any axis other than that actuator's axis of motion (that is, an axis defined by the actuator's extension and contraction). In example embodiments, magnetic force, gravity, and/or a pliable polymer, such as silicone, may be employed to keep the up to five DOF pivot points in contact with their respective (that is, top or bottom) plate in a contact region when the prismatic actuators are extended or retracted. In example embodiments at least two of the prismatic actuators are perpendicular to at least two other prismatic actuators. If a fifth axis is added, its associated prismatic actuator is arranged perpendicular to the other four prismatic actuators.

In example embodiments the actuators may be any of several types, such as: piezo actuators, manual micrometer screws, magnetic actuators, stepper motors with linear actuators (either integral or separate), hydraulic cylinders, pneumatic cylinders, or rotary motors with eccentric cams, for example. In example embodiments in accordance with principles of inventive concepts, the parallel position manipulator is configured such that the push and pull forces exerted by each actuator is greater than the shear friction of all the other actuators combined. In example embodiments this is accomplished by employing materials that have a high holding force but a low shear force, for example, such as a hard metal spherical surface magnetically held in contact with a hard, flat metal surface. In such embodiments only one of the sides (that is, either the hard metal spherical surface or the hard, flat metal surface) is magnetized, because if both sides are magnetic they will be semi-constrained in the sliding axis and, therefore, behave like a spherical three DOF joint.

In accordance with principles of inventive concepts, a positioning stage includes a plurality of magnetic prismatic joint actuators, a base plate and a top plate. The top plate may support a device for precise positioning thereof. The top plate may be supported by a plurality of magnetic prismatic joint actuators, which are, in turn, supported by the base plate. In example embodiments, each actuator is fixed to a portion of the baseplate, which positions each actuator at an angle relative to a vertical axis or plane. In example embodiments, the angle is forty-five degrees, which thereby positions actuators on opposite ends, or endpieces of the baseplate and ninety degrees to one another. In example embodiments, sides of the top plate are formed at the same angle to the vertical axis or plane as sides of the baseplate, although other configurations are contemplated within the scope of inventive concepts. Magnets are provided on the angled sides of the top plate. Each actuator includes, at its distal end, a magnetic material, which may be a ferrous metal, for example. In example embodiments, the magnetic material is in the shape of a hemisphere, but other shapes and combinations are contemplated within the scope of inventive concepts. In preferred embodiments, each magnetic material end is configured to contact a magnet on a side of the top plate to thereby support the top plate above the baseplate.

In operation, an actuator distal end is held in contact with a magnet on a side of the top plate through force of the magnet. As an actuator is activated (that is, extended or retracted), the top plate moves linearly in the direction of motion determined by the motion of the actuator. The distal end of an actuator in contact with a magnet on the opposite side of the top plate remains in contact with the magnet, through the magnetic force of the magnet operating upon the magnetic material of the actuator's distal end. At the same time, the distal end of this actuator allows the magnet (and top plate) to slide in a direction dictated by the motion of the activated actuator.

In accordance with the inventive concepts, provided is a parallel positioner, comprising a top plate, a baseplate, and three or more actuators configured to support the top plate over the baseplate and to move the top plate in response to extension or retraction of one or more actuators, wherein each of the actuators includes a joint having five degrees of freedom.

In various embodiments, each of the actuators includes a magnetic joint as a five degree of freedom joint.

In various embodiments, the top plate includes angled sides and the actuators are configured to extend from the baseplate to the top plate and to support the top plate along the angled sides of the top plate.

In various embodiments, in a neutral position, the angled sides of the top plate are at the same angle relative to a vertical axis or plane as the angled sides of the baseplate.

In various embodiments, each magnetic joint includes an end of an actuator formed of a hemispherical magnetic material and a magnet in a contacting region of a plate.

In various embodiments, each magnetic joint is formed on a side of the top plate, each respective actuator end forming the joint is configured to contact a magnet on the side of the top plate and each respective opposing end of the actuator is configured to be fixedly attached to the baseplate.

In various embodiments, the parallel positioner includes four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle relative to a vertical axis or plane.

In various embodiments, the actuators are configured such that the same amount of extension or retraction of any pair of actuators produces movement of the top plate solely along a single axis, and said extension or retraction is carried out under control of an electronic controller.

In accordance with another aspect of the inventive concept, provided is a method of positioning a device, comprising providing a top plate upon which the device rests, providing a baseplate to support the top plate, and providing three or more actuators between the top plate and baseplate, the actuators configured to support the top plate over the baseplate and moving the top plate by extension or retraction of one or more actuators, wherein each of the actuators includes a joint having five degrees of freedom.

In various embodiments, each of the actuators includes a magnetic joint as a five degree of freedom joint.

In various embodiments, the top plate includes angled sides and the actuators are configured to extend from the baseplate to the top plate and to support the top plate along angled sides of the top plate.

In various embodiments, in a neutral position, the angled sides of the top plate are at the same angle relative to the vertical axis or plane as the angled sides of the baseplate.

In various embodiments, each magnetic joint includes an end of an actuator formed of a hemispherical magnetic material and a magnet in a contacting region of a plate.

In various embodiments, each magnetic joint is formed on a side of the top plate, each respective actuator end of the joint is configured to contact a magnet on the side of the top plate and each respective opposing end of the actuator is configured to be fixedly attached to the baseplate.

In various embodiments, the method of positioning includes providing four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle to a vertical axis or plane.

In various embodiments, the actuators are configured such that the same amount of extension or retraction of any pair of actuators produces movement of the top plate solely along a single axis and said extension or retraction is carried out under control of an electronic controller.

In accordance with another aspect of the inventive concept, provided is a photonic positioning device, comprising a photonic device, a top plate supporting the photonic device, a baseplate, and three or more actuators configured to support the top plate over the baseplate and to move the top plate in response to extension or retraction of one or more actuators, wherein each of the actuators includes a joint having five degrees of freedom.

In various embodiments, the photonic device is an optical fiber splicer.

In various embodiments, the photonic positioning device further comprises four prismatic actuators each forming magnetic joints with sides of the top plate, two actuators per side, and each prismatic actuator fixed to the baseplate at the other end, wherein endpieces of the baseplate and sides of the top plate, when in a neutral position, are formed at the same angle to a vertical axis or plane.

In various embodiments, the actuators are configured such that the same amount of extension or retraction of any pair of actuators produces movement of the top plate solely along a single axis, and said extension or retraction is carried out under control of an electronic controller.

In accordance with another aspect of the inventive concepts, provided is a parallel positioner, comprising a top plate, a baseplate, and at least four actuators configured to support the top plate over the baseplate and to move the top plate in response to extension or retraction of one or more actuators, wherein at least some of the actuators includes a joint having five degrees of freedom.

In various embodiments, each of the actuators includes a joint having five degrees of freedom.

In various embodiments, less than all of the actuators includes a joint having five degrees of freedom.

In various embodiments, at least one of the actuators includes a joint having four degrees of freedom.

In various embodiments, top plate includes a first angled side and a second angled side and the baseplate includes a first angled side piece corresponding to and parallel with the first angled side and a second angled side piece corresponding to and parallel with the second angled side.

In various embodiments, the baseplate includes an intermediate portion from which the side pieces and extend.

In some embodiments, the intermediate portion is planar.

In accordance with another aspect of the inventive concepts, provided is a positioner comprising a structure, at least one base, and a plurality of actuators configured to support the structure over the at least one base and to move the structure in response to extension or retraction of one or more actuators. Three or more of the actuators maintains contact with the structure through a joint having at least four degrees of freedom (DOF).

In various embodiments, the three or more of actuators includes at least two actuators that maintain contact with the structure through a joint having five DOF.

In various embodiments, three or more actuators includes at least two actuators that maintain contact with the structure through a joint having four DOF.

In various embodiments, at least one joint having four DOF is a magnetic joint.

In various embodiments, at least one joint having five DOF is a magnetic joint.

In various embodiments, each of the three or more actuators has a magnetic joint with the structure.

In various embodiments, an actuator having a 4 DOF joint with the structure has a cylindrical end that contacts the structure.

In various embodiments, an actuator having a 5 DOF joint with the structure has a hemispherical end that contacts the structure.

In various embodiments, the structure includes a lengthwise groove, depression, or channel.

In various embodiments, the lengthwise groove, depression, or channel is configured to hold at least one optical fiber.

In various embodiments, the structure includes a V-groove configured to hold at least one optical fiber.

In various embodiments, wherein the positioner further comprises a top plate and the at least one base comprises at least one base plate, wherein the three or more actuators that support the top plate are coupled to the at least one base plate.

In various embodiments, the top plate includes angled sides engaged by the plurality of actuators and the at least one base plate includes angle side pieces to which the three or more actuators is coupled and the angled sides of the top plate and the angled side pieces of the at least one base plate have the same angle with respect to a vertical plane or axis.

In various embodiments, the positioner further comprises an end plate including a coupling to an end of the structure.

In various embodiments, the coupling is a magnetic coupling.

In accordance with another aspect of the inventive concepts, provided is a positioner, comprising a top plate, a baseplate, and three or more actuators configured to support the top plate over the baseplate and to move the top plate in response to extension or retraction of one or more actuators, wherein each of the actuators maintains contact with the top plate through a joint having at least four degrees of freedom (DOF).

In various embodiments, the three or more actuators includes at least two actuators that maintain contact with the top plate through a joint having four DOF and at least one actuator that maintains contact with the top plate though a joint having five DOF.

In various embodiments, the top plate includes angled sides engaged by the three or more actuators and the base plate includes angle side pieces to which the three or more actuators are coupled and the angled sides of the top plate and the angled side pieces of the base plate have the same angle with respect to a vertical plane or axis In various embodiments, the actuators having a 4 DOF joint with the top plate have a cylindrical end.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 5 shows a first view of the four-axis stage of FIG. 2, with the first and third actuators extended along the "X AXIS", wherein a second actuator (not shown) is behind the first actuator and a fourth actuator (not shown) is behind the third actuator;

FIG. 6 shows a second view, opposite the first view, of the four-axis stage of FIG. 2, with the second and fourth actuators extended along the "Y AXIS", wherein the first actuator (not shown) is behind the second actuator and third actuator (not shown) is behind the fourth actuator;

FIG. 7 shows the first view of the four-axis stage of FIGS. 2 and 5, with the first actuator retracted and the third actuator extended to pitch the top plate, wherein the second actuator (not shown) is behind the first actuator and the fourth actuator (not shown) is behind second actuator;

FIG. 8 shows the second view of the four-axis stage of FIGS. 2 and 6, with the second actuator extended and the fourth actuator retracted to yaw the top plate, wherein the first actuator (not shown) is behind the second actuator and the third actuator (not shown) is behind fourth actuator;

FIG. 10 shows a table of single axis/dual actuator moves that can be applied to a four-axis stage, in accordance with principles of the inventive concepts;

FIG. 11 shows a table of single axis/single actuator moves that can be applied to a five-axis stage, in accordance with principles of the inventive concepts;

DETAILED DESCRIPTION OF PREFERRED EMBODIMENTS

Figure 1:
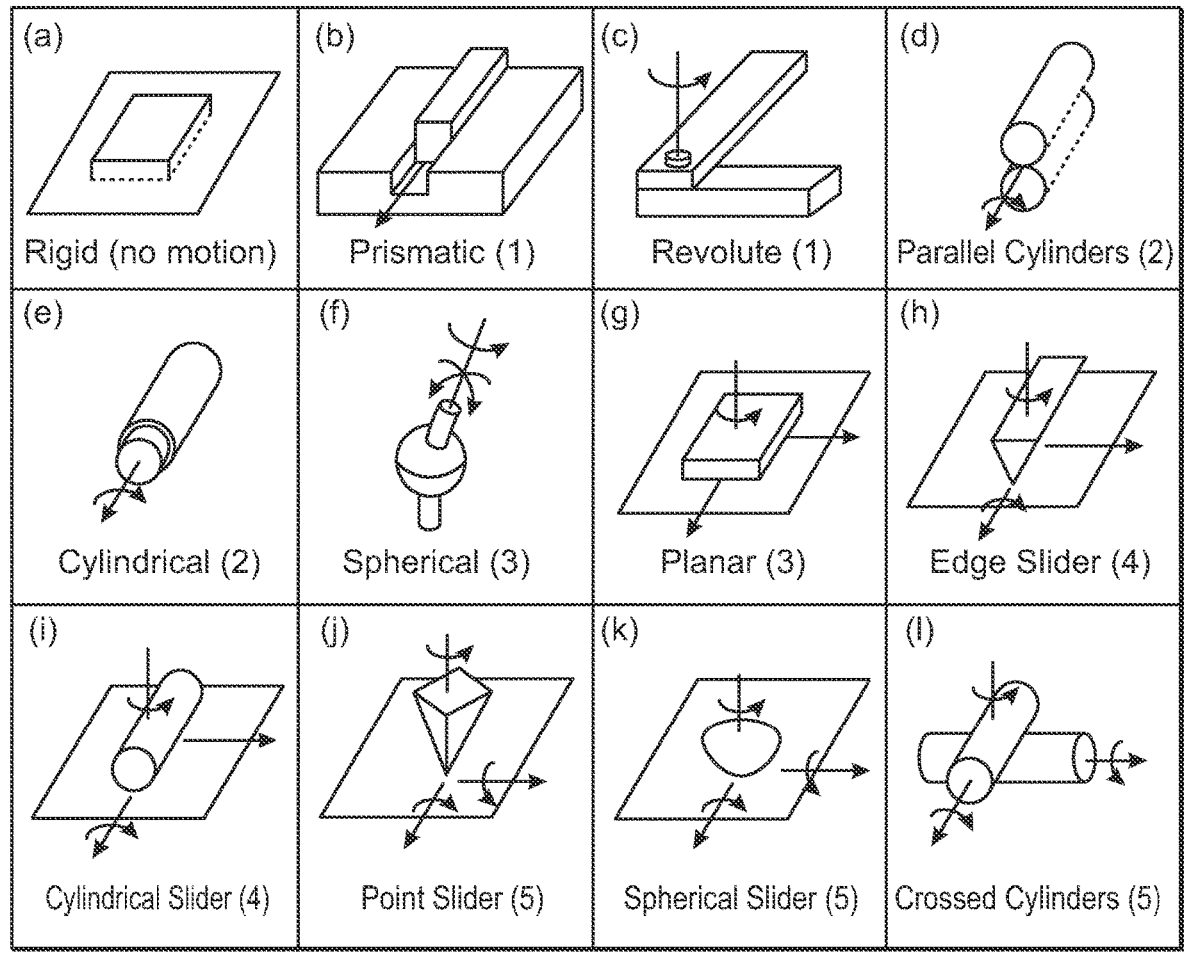
FIG. 1 illustrates a variety of conventional kinematic joints.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In example embodiments in accordance with principles of inventive concepts, a multi-axis positioner or positioning stage includes a support plate supported by a plurality of actuators, such as one or more prismatic joint actuators. In preferred embodiments, one or more of the actuators includes an actuator joint having five Degrees of Freedom (DOF) with respect to the support plate. In various embodiments, one or more actuators includes an actuator joint having four DOF with respect to the support plate. In operation, when one or more of the actuators extends or contracts, the pivot points of the 5 DOF actuators are allowed to shift in any axis other than that actuator's axis of motion (that is, an axis defined by the actuator's extension and contraction).

In various embodiments, the support plate can include a top surface supporting an object and a bottom surface engaged by movable ends of at least some of the actuators. One or more of the actuators can be disposed between the top plate and one or more structures. In some embodiments, at least some of the actuators can have a first end that is secured or coupled to a base plate or base structure and a second end that engages and moves the support (or top) plate.

In example embodiments, magnetic force, gravity, and/or a pliable polymer, such as silicone, may be employed to keep the five DOF pivot points in contact with their respective (that is, top or bottom) plate when the prismatic actuators are retracted.

In some example embodiments, at least two of the prismatic actuators can be perpendicular to at least two other prismatic actuators.

In some embodiments, a fifth axis of movement can be included. If a fifth axis is included, its associated prismatic actuator can be arranged perpendicular to the other four prismatic actuators, in some embodiments.

In example embodiments, the actuators may be any of several types, such as: piezo actuators, manual micrometer screws, magnetic actuators, stepper motors with linear actuators (either integral or separate), hydraulic cylinders, pneumatic cylinders, or rotary motors with eccentric cams, for example. In example embodiments in accordance with principles of inventive concepts, the position is configured such that the push and pull forces exerted by each actuator is greater than the shear friction of all the other actuators combined. In example embodiments, this can be accomplished by employing materials that have a high holding force but a low shear force, for example, such as a hard, metal actuator end, e.g., having a spherical, flat, or point surface, magnetically coupled to and held in contact with a hard, flat metal surface of the support plate. In such embodiments only one of the contact surfaces (that is, either the hard, metal actuator end surface or the hard, flat metal surface) is magnetized, because if both sides are magnetic they will be semi-constrained in the sliding axis and, therefore, behave like a spherical 3DOF joint.

In example embodiments in accordance with principles of inventive concepts, a positioning stage includes a plurality of prismatic joint actuators, a base plate (or structure) and a top plate. The top plate may support a device for precise positioning thereof, and is a support plate. The top plate may be supported by a plurality of prismatic actuators, which are, in turn, supported by the base plate or other structure. In example embodiments, one or more actuators is fixed to a portion of the baseplate, which positions each actuator at an angle relative to a vertical axis or plane. In example embodiments, sides of the top plate are formed at the same angle to the vertical axis or plane as sides of the baseplate, although other configurations are contemplated within the scope of inventive concepts. For instance, the vertical plane can be a plane running vertically the length of the center of the top plate and base plate. In various embodiments, one or more sides of the top plate can be parallel to one or more sides of the base plate in at least one position of the top plate, e.g., when the actuators have equal lengths.

In various embodiments, a magnetic field can be established between the supporting actuator ends and the sides of the top plate, such that, for at least one actuator, a magnetic joint is formed between a portion of the top plate surface and the actuator end. In various embodiments, either the actuator end or the angled sides of the top plate includes or is formed of a magnetic field generating material, e.g., a magnet, and the other includes or is made from magnetic material, e.g., a ferrous metal. In example embodiments, if an end of an actuator can be in the shape of a hemisphere, but other shapes and combinations, such as cylinders, are contemplated within the scope of inventive concepts. In various embodiments, the actuator ends include or are formed from a magnetic material and each magnetic material end is configured to contact a magnet or magnetic surface on a side of the top plate to thereby movably support the top plate above the baseplate.

In some embodiments, the magnet on the side of the top plate conforms to an outer surface of the top plate. An inner surface of the top plate need not be or include a magnet. In some embodiments, the top plate can have a cross section with a planar shape, a V-shape, a semi-cylindrical shape, or another shape.

In operation, in a preferred embodiment, an actuator distal end is maintained in contact with a magnet on an outer surface or side of the top plate through force of the magnet. As an actuator is activated, e.g., extended or retracted, the top plate moves responsively in the direction of motion determined by the motion of the actuator. Therefore, the actuator can be extendible and retractable along an axis. The distal end of an actuator in contact with a magnet on an opposite side of the top plate remains in contact with the magnet, through the magnetic force of the magnet operating upon the magnetic material of the actuator's distal end. At the same time, the distal end of such actuator allows the magnet (and top plate) to slide in a direction dictated by the motion of the activated actuator. With respect to activation, this opposite side actuator can be passive, i.e., not activated, or activated in a different direction and/or to different extents, in various embodiments.

A multi-axis positioner or positioning stage in accordance with principles of inventive concepts can take the form of a parallel positioner. As a parallel position, the apparatus does not suffer from the mechanical stack up issues associated with multiple single axis stages stacked on top of each other in what may be referred to as a kinematic chain. Additionally, unlike a hexapod, a positioning stage in accordance with principles of inventive concepts allows for any combination of the four actuators to extend or contract any amount at any speed without the stage binding. Each actuator can be arranged to affect movement in two different axes of the top plate of the stage. To implement a single axis of motion, two actuators may be moved in a manner in which they complement one another in the desired axis and cancel each other in an undesired axis. As a result, in example embodiments in accordance with principles of inventive concepts, single-axis stage moves can employ dual actuator moves. Single-axis stage moves, and the associated actuator actions, are shown in the tables of FIGS. 10 and 11.

In addition to being a parallel actuator, a positioning stage in accordance with principles of inventive concepts can have several other benefits. For example, a positioning stage in accordance with principles of inventive concepts is scalable from four to six axes, incrementally, whereas a Stewart Platform always has three or six axes. Unlike a kinematic chain, a positioning stage in accordance with principles of inventive concepts does not exhibit tolerance stack up of individual stages. A positioning stage in accordance with principles of inventive concepts does not require rotary or linear bearings, whereas a kinematic chain requires one for each axis of freedom. With a positioning stage in accordance with principles of inventive concepts, each axis of motion only requires two actuators that move at a fixed, intuitive ratio and, therefore, desired motion is relatively easy to achieve. As previously indicated, this is not the case with a Stewart Platform. Additionally, unlike a Stewart Platform, the speed of actuation need not be controlled to prevent stage binding and individual actuators can be moved without binding the stage. In example embodiments, the positioning stage top plate may be readily removed and replaced simply by decoupling the interfaces, such as magnetic interfaces between the actuators and the top plate.

In example embodiments, the resolution and stiffness of the positioning stage may be dependent on the quality of the actuators, the smoothness of the slider components, whether hemispherical, cylindrical, or otherwise, and the strength of the magnetic (or other) force holding the joints formed between the actuators and the top plate together. All of these aspects can be optimized to create a submicron precision positioning stage for a small fraction of the cost of a similar precision hexapod. In many cases, a positioning stage in accordance with principles of inventive concepts will outperform a standard kinematic chain while, at the same time, being more cost-effective. In example embodiments, the holding force (for example, magnetic holding force) of an actuator slider (or other four of five DOF connection) is greater than the coefficient of friction of all of the other actuator joints. When this is true, the top plate will settle at an equilibrium that allows the four (or more) connections to slide or pivot as needed to ensure that all of the points of contact are maintained.

Figure 15:
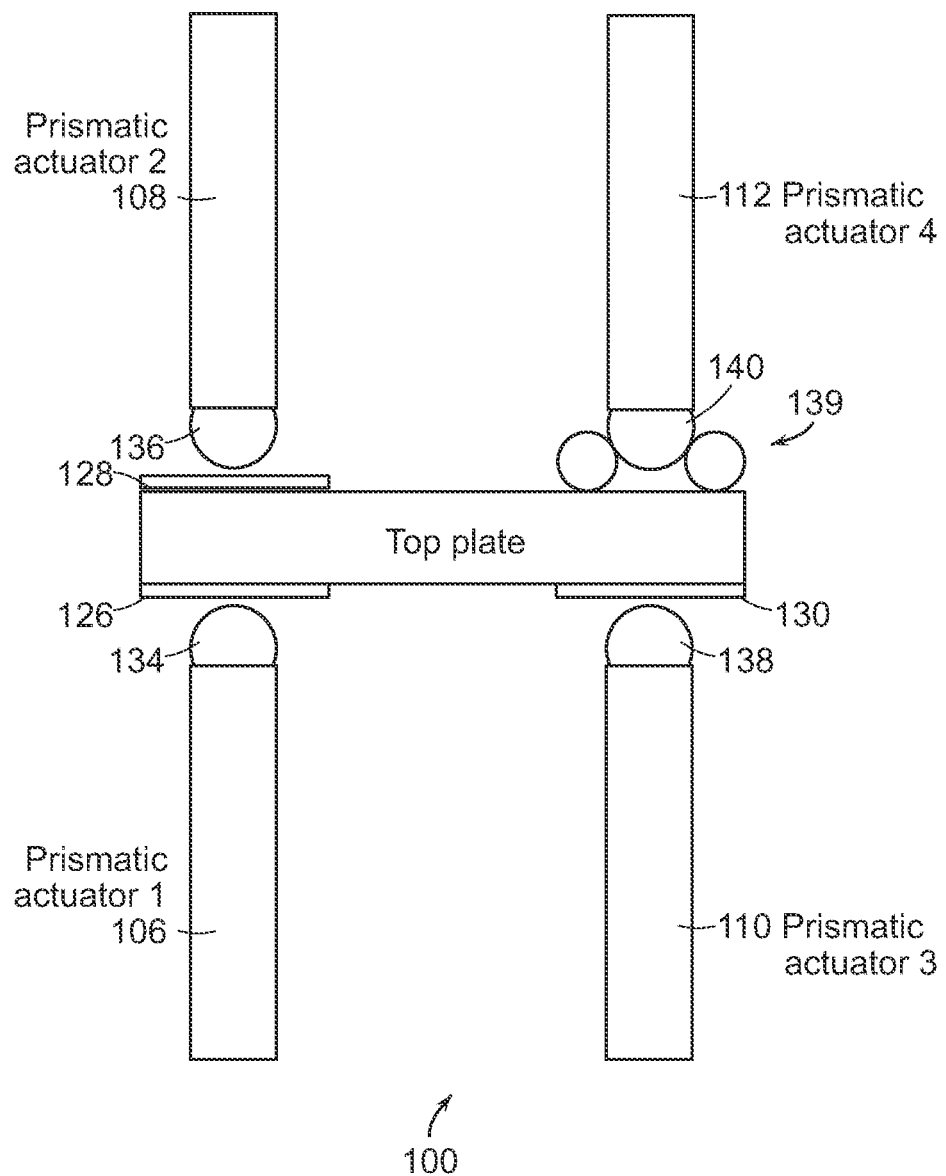
FIG. 15 is a view of an embodiment of a five-axis positioning stage employing cylinder magnets in a joint, in accordance with principles of the inventive concepts.

A four axis positioning stage with a constrained Z axis in which other degrees of freedom are not interfered with may be implemented in accordance with principles of inventive concepts by using a rigid beam to constrain or restrict such Z axis movement, or by replacing one of the four five-DOF actuator joints with a four-DOF joint, restricting motion in the Z axis, as illustrated in FIG. 15.

FIGS. 2-9, in combination, provide views of example embodiments of a four-axis positioning stage in accordance with principles of inventive concepts.

Figure 2:
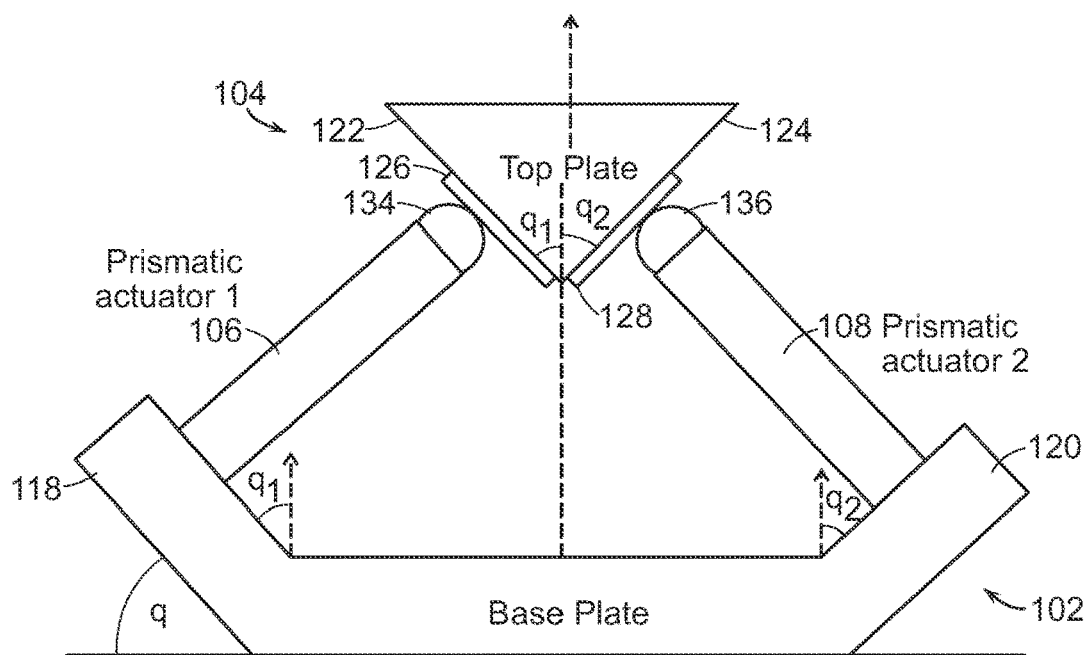
FIG. 2 shows a front, end view of embodiment of a four-axis positioning stage, or positioner with all actuators retracted, wherein a third actuator (not shown) is behind the first actuator and a fourth actuator (not shown) is behind the second actuator.

FIG. 2 shows a front, end view of embodiment of a multi-axis positioning stage, or positioner with all actuators retracted, wherein a third actuator (not shown) is behind the first actuator and a fourth actuator (not shown) is behind the second actuator. FIGS. 5-9 show the third and fourth actuators. As can be seen, for example, from FIG. 9, the third actuator is behind first actuator and the fourth actuator is behind second actuator.

With respect to FIG. 2, all actuators are retracted in this view. In this example embodiment, the positioning stage is a four-axis positioning stage 100 that includes base plate 102, top plate 104, and a plurality of actuators, which can be prismatic actuators. The plurality of actuators includes a first actuator 106 (i.e., prismatic actuator 1), a second actuator 108 (i.e., prismatic actuator 2), a third actuator 110 (i.e., prismatic actuator 3), and a fourth actuator 112 (i.e., prismatic actuator 4).

In example embodiments, baseplate 102 includes angled side pieces 118, 120. In this embodiment, $\theta_1$ and $\theta_2$ respectively represent angles of interior surfaces of the side pieces 118 and 120 relative to a vertical axis and/or plane. The angled side pieces of the base plate may also be formed at an angle $\theta$ with respect to a horizontal plane, here $\theta=\theta_1=\theta_2$ in this embodiment. In other embodiments, it may be possible for $\theta\neq\theta_1$, $\theta\neq\theta_2$ and/or $\theta_1\neq\theta_2$. In other embodiments, $\theta$ may be irrelevant, and $\theta_1=\theta_2$ can still hold true. In this embodiment, exterior sides 122, 124 of top plate 104 are formed at the same angles $\theta_1$, $\theta_2$ relative to the vertical axis and/or plane. Therefore, the inner surface of the side piece 118 of the base plate 102 can be parallel to exterior side 122 of the top plate 104 and the inner surface of the side piece 120 of the base plate 102 can be parallel to exterior side 124 of the top plate 104. The vertical plane can be a plane running vertically the length of the center of the top plate 104 and base plate 102.

In the embodiment of FIG. 2, the base plate 102 includes an intermediate portion from which the side plates 118 and 120 extend. The intermediate portion can be a planar piece that lies in the horizontal plane, but the intermediate portion need not be planar in all embodiments. Also, while side pieces 118, 120 are shown as being connected or part of the same structure, they need not be in all embodiments. In other embodiments, side pieces 118, 120 could be parts of different structures or separate plates attached to one or more other structures.

In this embodiment, each of the actuators 106, 108, 110, and 112 extends from one of the side pieces 118, 120 of the base plate 102, in a direction toward the top plate 104. For example, in this embodiment, each actuator is secured or coupled to a side piece of the base plate 102 and extends at an angle of 90 degrees with respect to the corresponding side piece 118 or 120 toward the corresponding side 122 or 124 of the top plate 104.

A distal end of each actuator 106, 108, 110, and 112 includes a magnetic material. In this embodiment, each of the actuators 106, 108, 110, and 112 includes ferrous metal hemispheric ends 134, 136, 138 and 140. Magnets 126, 128, 130, and 132 are disposed on or in the sides 122, 124 of the top plate 104 in locations corresponding to the ferrous metal hemispheric ends 134, 136, 138, and 140 of respective actuators 106, 108, 110, and 112.

Figure 3:
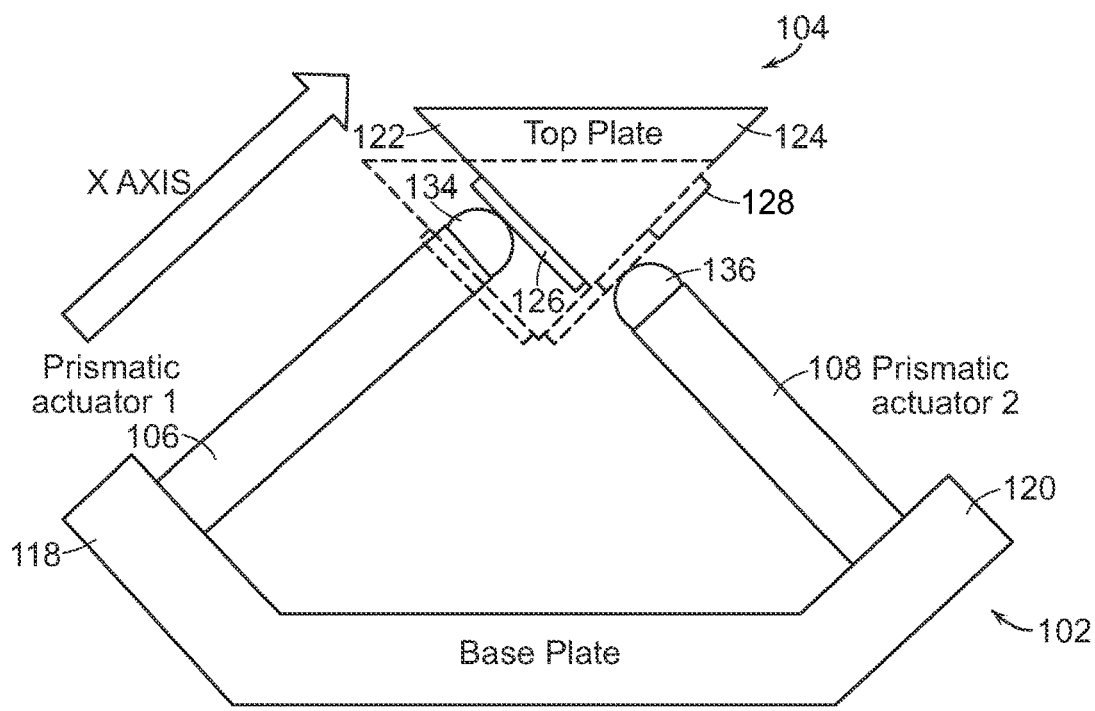
FIG. 3 shows the same front, end view of the four-axis stage of FIG. 2, with the first actuator and third actuator extended along an axis ("X AXIS")

FIG. 3 shows the same front, end view of the four-axis positioning stage of FIG. 2, with the first actuator and third actuator extended along an axis ("X AXIS"). In FIG. 3 the first actuator 106 and the third actuator 110 are extended to move the top plate 104 in the direction of the X axis, as indicated by the "X AXIS arrow." As previously indicated, the third actuator 110 (actuator 3) is behind first actuator 106 (actuator 1) and the fourth actuator 112 (actuator 4) is behind the second actuator 108 (actuator 2). In example embodiments, actuator 1 106 and actuator 3 110 are extended the same amount in order to provide purely X axis movement. Broken lines indicate the original location of the top plate 104 and magnets 126, 128, which is the position of the top plate in FIG. 2.

Figure 4:
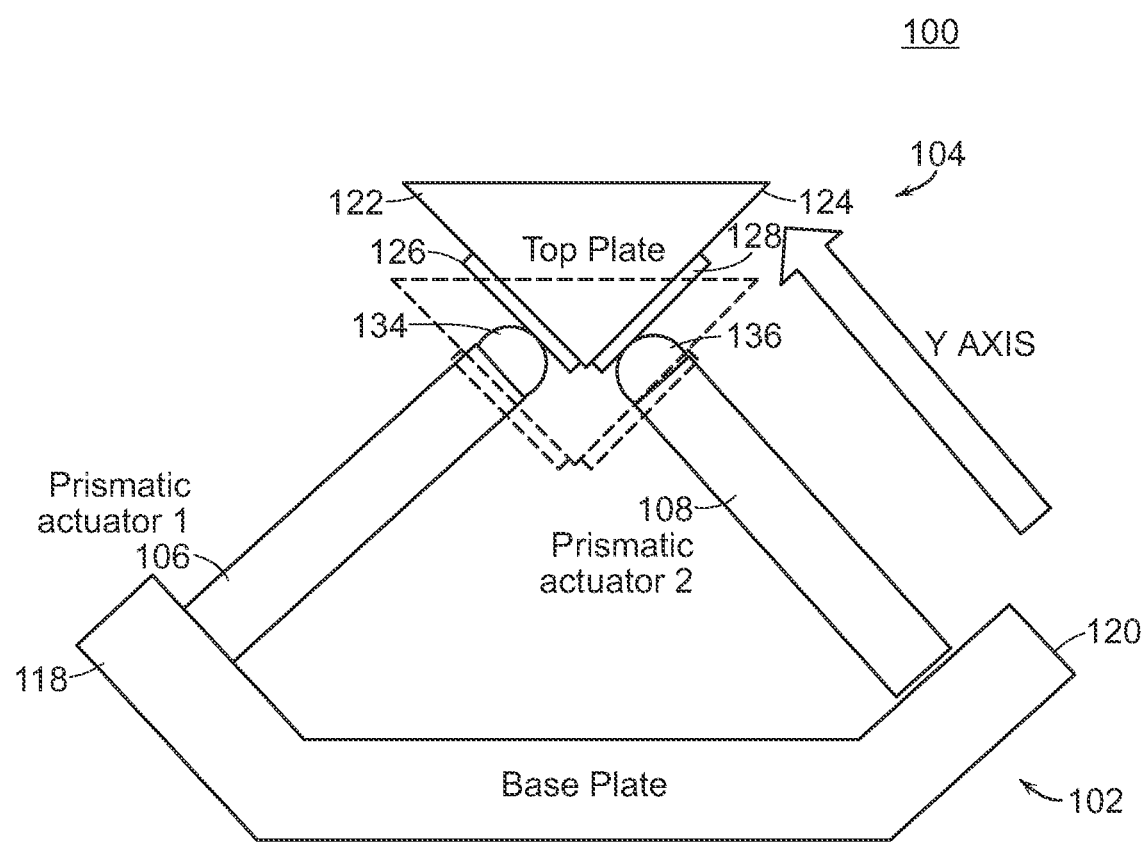
FIG. 4 shows the same end view of the four-axis stage of FIG. 2, with the second actuator and the fourth actuator extended along an axis ("Y AXIS")

FIG. 4 shows the same end view of the four-axis positioning stage of FIG. 2, with the second actuator and the fourth actuator extended along an axis ("Y AXIS"). In the example embodiment of FIG. 4, actuators 1 106 and 3 110 (X axis) and actuators 2 108 and 4 112 (Y axis) are extended. As previously indicated, the third actuator 110 is behind the first actuator 106 and the fourth actuator 112 is behind the second actuator 108. In example embodiments, the first actuator 106 and the third actuator 110 are extended the same amount in order to provide X axis movement and second actuators 108 and fourth actuator 112 are extended the same amount in order to provide Y axis movement. Broken lines indicate the original location of the top plate 104 and magnets 126, 128.

FIG. 5 shows a view with the first and third actuators of the four-axis positioning stage of FIG. 2 extended along the "X AXIS", wherein a second actuator (not shown) is behind the first actuator and a fourth actuator (not shown) is behind the third actuator. In the example embodiment of FIG. 5, the first actuator 106 and the third actuator 110 are extended by the same amount to produce movement solely in the direction of the X axis. The second actuator 108 is behind the first actuator 106 and the fourth actuator 112 is behind the third actuator 110 from this perspective. Broken lines indicate the original location of the top plate 104 and magnets 126, 130.

FIG. 6 shows a view with the second and fourth actuators of the four-axis positioning stage of FIG. 2, extended along the "Y AXIS", wherein the first actuator (not shown) is behind the second actuator and the third actuator (not shown) is behind the fourth actuator. In the embodiment of FIG. 6, the second actuator 108 and the fourth actuator 112 are extended the same amount to produce movement solely in the direction of the Y axis. The first actuator 106 is behind the second actuator 108 and the third actuator 110 is behind the fourth actuator 112 from this perspective. Broken lines indicate the original location of the top plate 104 and magnets 128, 132.

FIG. 7 shows a view with the first actuator 106 retracted and the third actuator 110 extended to pitch the top plate 104, wherein the second actuator 108 (not shown) is behind the first actuator and the fourth actuator 112 (not shown) is behind the second actuator.

FIG. 8 shows a view of the four-axis positioning stage with the second actuator 108 extended and the fourth actuator 112 retracted to yaw the top plate 104, wherein the first actuator 106 (not shown) is behind the second actuator and the third actuator 110 (not shown) is behind the fourth actuator.

Figure 9:
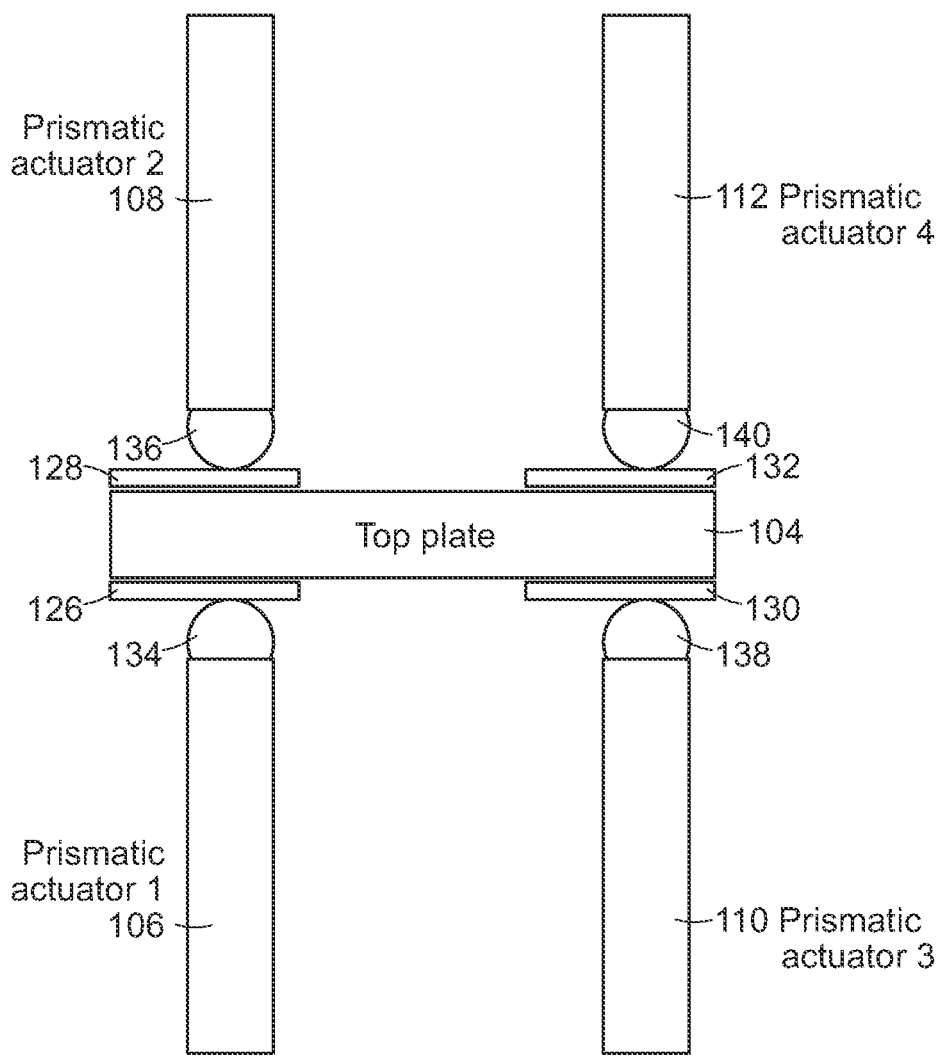
FIG. 9 shows a view of the four-axis stage of FIG. 2, with the base plate omitted for clarity.

FIG. 9 shows a view of the four-axis positioning stage of FIG. 2, with the base plate 102 omitted for clarity. In the example embodiment of FIG. 9, this view of a four-axis positioning stage illustrates the relative position of the first, second, third, and fourth actuators 106, 108, 110, and 112, along with the respective associated magnets 126, 128, 130, and 132 and the top plate 104.

FIG. 10 shows a table of single axis/dual actuator moves that can be applied to a four-axis positioning stage, in accordance with principles of the inventive concepts. The table of FIG. 10 illustrates combinations of dual actuator moves that implement top plate movements in accordance with principles of inventive concepts. For example, to extend the top plate solely in the positive X axis direction, the first actuator 106 and the third actuator 110 are extended while the second actuator 108 and the fourth actuator 112 are left in place; to extend the top plate solely in the positive Y axis direction, the second actuator 108 and the fourth actuator 112 are extended while the first actuator 106 and the third actuator 110 are left in place.

Figure 12:
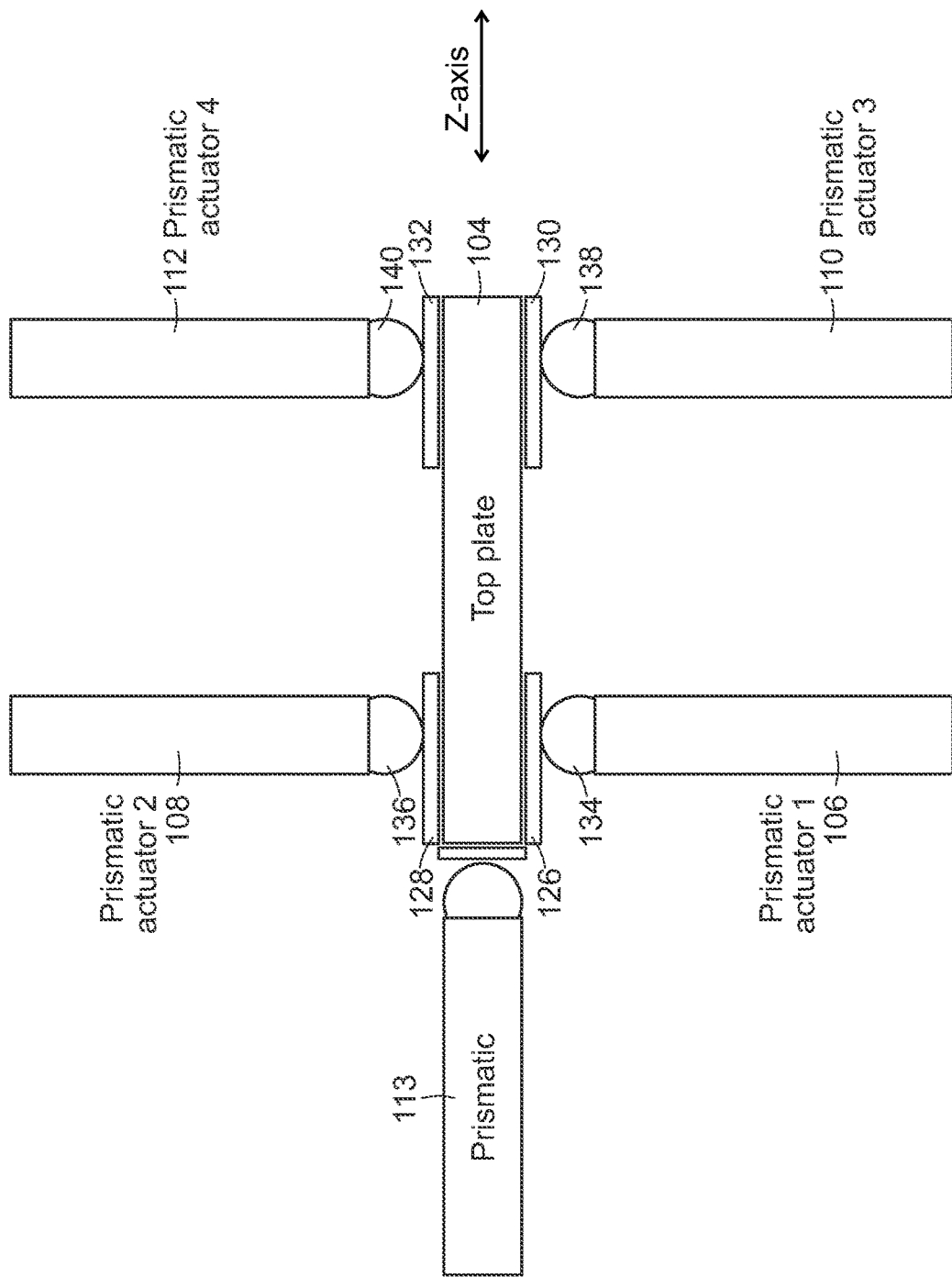
FIG. 12 shows an embodiment of a five-axis positioning stage top view, in accordance with principles of the inventive concepts.

FIG. 11 shows a table of single axis/single actuator moves that can be applied to a five-axis positioning stage, in accordance with principles of the inventive concepts. For example, FIG. 12 shows a fifth actuator 113 added to affect movement of the top plate 4 in a Z AXIS, which lies in a horizontal plane. In other embodiments, a sixth actuator could be provided opposite the fifth actuator.

The table of FIG. 11 shows single axis, single actuator movements of the fifth actuator 113, as an example, if added to the actuators 106, 108, 110, and 112. That is, the table of FIG. 11 could be appended to the table of FIG. 10 if five actuators were used. Therefore, a five-axis positioning stage, such as that illustrated in FIG. 12, can be provided with movement in the positive Z axis direction effected by extension of fifth actuator 113 and movement in the negative Z axis direction effected by retraction of fifth actuator 113. In example embodiments in which a four-axis positioning stage is used, with the Z axis constrained, the fifth actuator 113 may be replaced with a rigid beam, for example.

Figure 13:
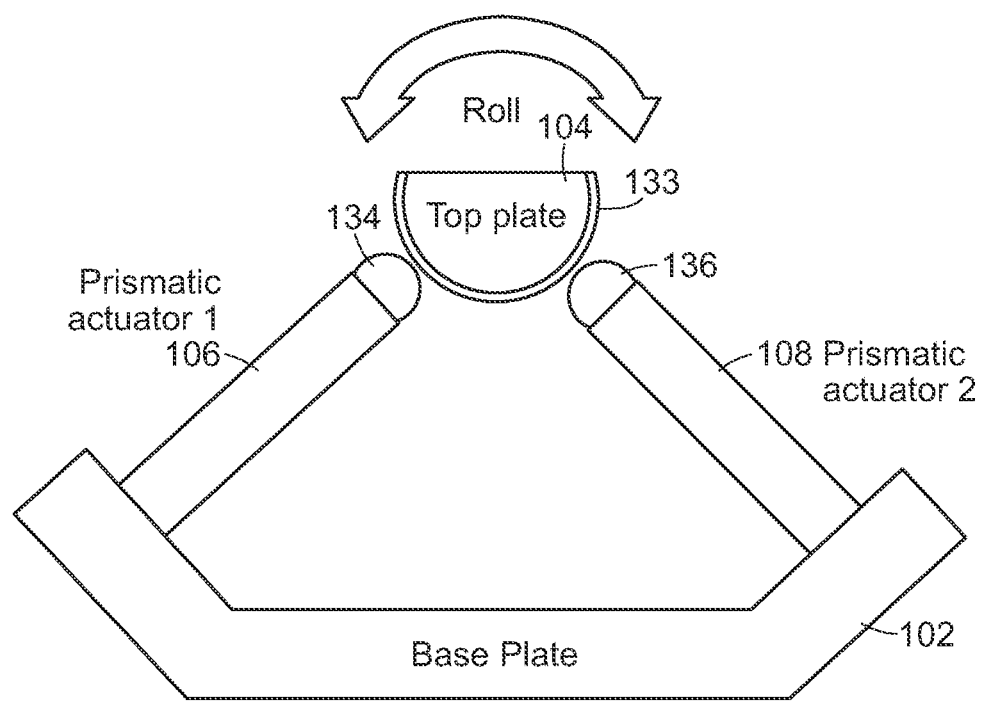
FIG. 13 shows another embodiment of multi-axis positioning stage that can achieve a "roll" motion of a top plate, in accordance with principles of the inventive concepts.

FIG. 13 shows another embodiment of multi-axis positioning stage that can achieve a "roll" motion of a top plate, in accordance with principles of the inventive concepts. In an example embodiment in accordance with principles of inventive concepts, a sixth axis of motion, roll, may be introduced as illustrated in FIG. 13. In this example embodiment, the top plate 104 is semi-cylindrical, as is magnet 133. In such example embodiments, the operation of the sixth axis does not interfere with operation of the other five. The roll can be achieved through selective extending and/or retracting of actuators 106, 108, 110, and 112. A fifth actuator 113 could again be optional and provided if movement in the Z-axis was intended.

Figure 14B:
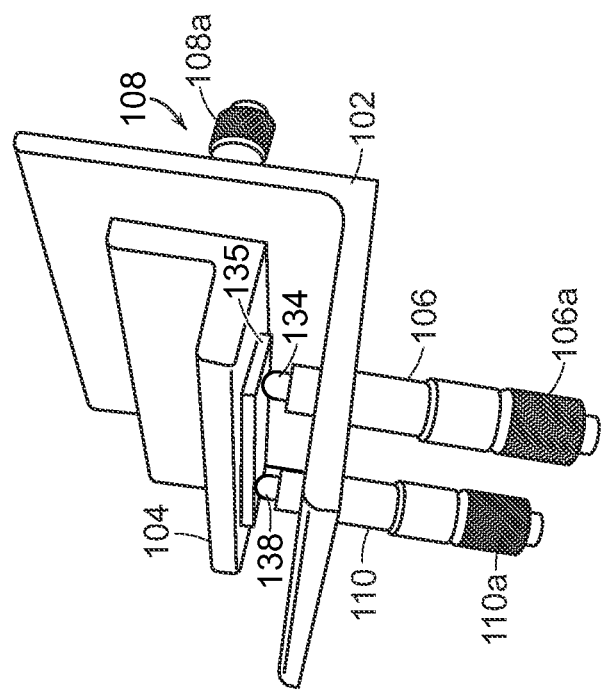
FIGS. 14A-C are views of another embodiment of a four-axis stage using manual actuators capable of single digit micron precision, in accordance with principles of the inventive concepts.
Figure 14A:
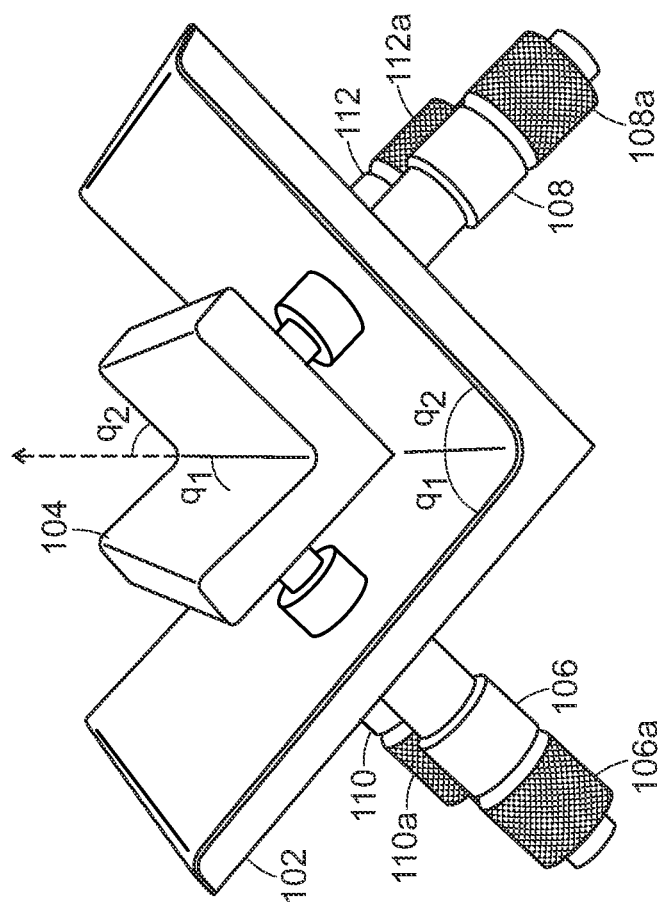
Figure 14C:
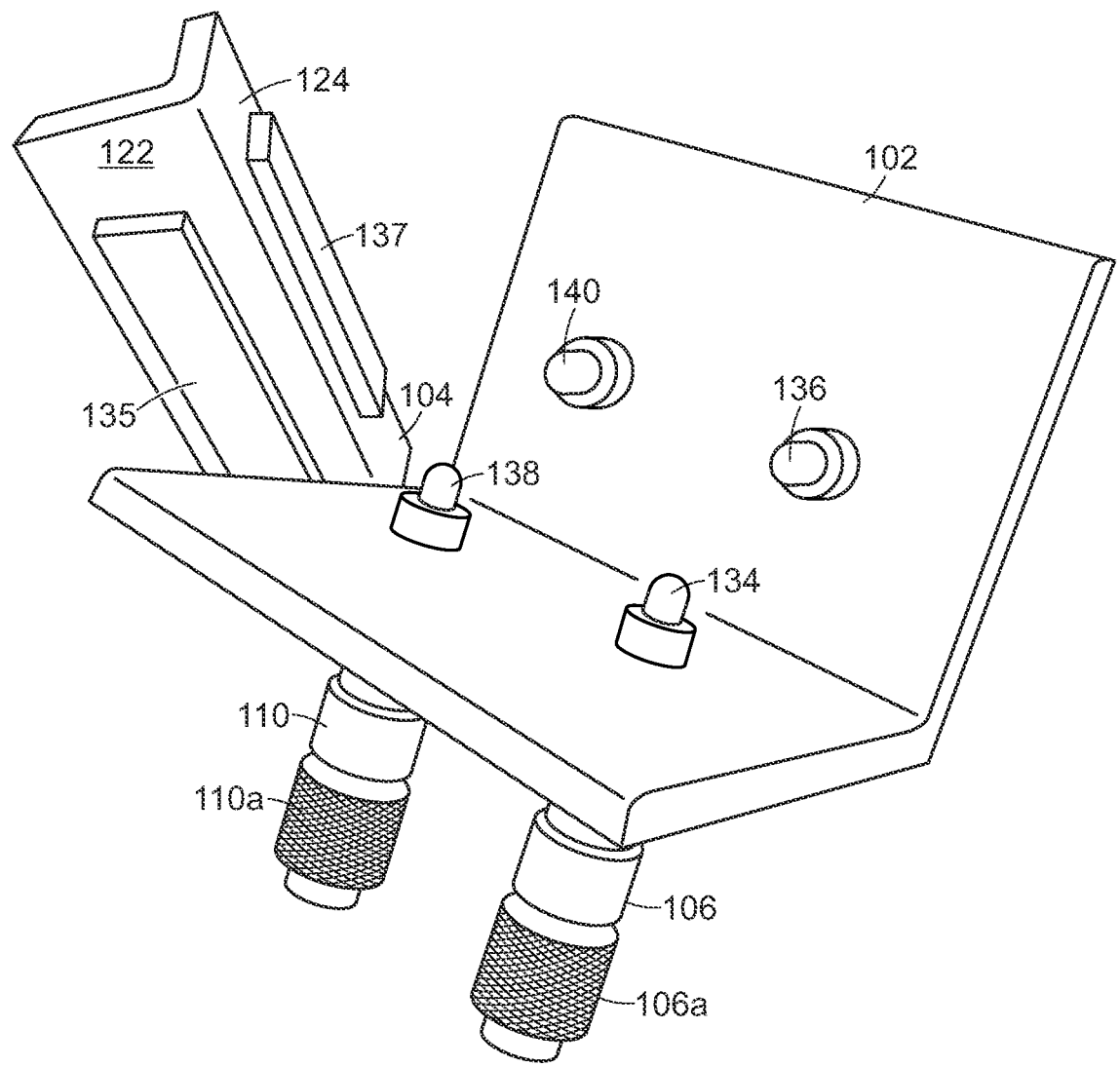

FIGS. 14A, 14B, and 14C provide end, perspective, and exploded views, respectively, of an example positioner in accordance with principles of inventive concepts. In this example embodiment, top plate 104 and baseplate 102 are V-shaped, with sides having the same angle θ with respect to a vertical axis, where $\theta=\theta_1=\theta_2$ in this embodiment. In other embodiments, it may be possible for $\theta_1 \neq \theta_2$. In this example embodiment, first through fourth actuators 106, 108, 110 and 112 penetrate baseplate 102 to contact magnets 135, 137 positioned on sides of top plate 104.

Magnets 135 and 135 are disposed on or in the sides 122, 124 of the top plate 104 in locations corresponding to the ferrous metal hemispheric ends 134, 136, 138, and 140 at distal ends of respective actuators 106, 108, 110, and 112.

In example embodiments actuators 106, 108, 110, and 112 may be precision adjustment mechanisms, such as micrometer screws 106a, 108a, 110a, 112a, that allow single-digit micron precision adjustment.

FIG. 15 is a view of an embodiment of a five-axis positioning stage employing cylinder magnets in a joint, in accordance with principles of the inventive concepts. As illustrated in the example embodiment of FIG. 15, one of the magnets 139, in this example embodiment, affixed to top plate 104 may be in the form of cylindrical magnets, for example, that yield a four DOF joint that results in a positioner with restricted motion in the Z axis. The cylinder magnets could be configured, by bending, for example, to yield a sixth axis, of roll.

Figure 16:
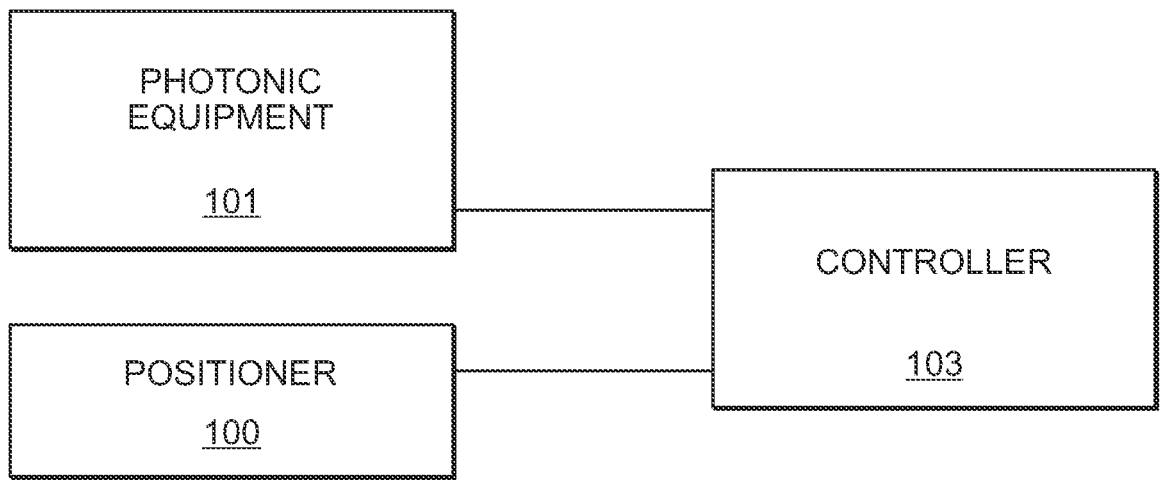
FIG. 16 is a block diagram of an embodiment of a photonic positioner, including electronic controller, in accordance with principles of inventive concepts.

FIG. 16 is a block diagram of an embodiment of a photonic positioner, including electronic controller, in accordance with principles of inventive concepts. The block diagram of FIG. 16 depicts a photonic system 200 that employs a photonic device 101, such as a fiber splicer or component thereof, such as an alignment device, in conjunction with a positioner 100 in accordance with principles of inventive concepts. In example embodiments, positioner 100 is controlled by controller 103, which operates the positioner's actuators in a manner previously described to precisely move photonic device 101. Such movement may allow for the alignment of optical fiber ends, for example. Controller 103 may receive feedback, for example, from photonic equipment 101 that the controller employs to adjust positioner 100. In example embodiments in which the photonic equipment 101 is a splicer, for example, sensors indicative of the quality of alignment between fibers may provide indicia to controller 103, which employs such indicia to adjust positioner for precise alignment of optical fibers, for example.

Figure 17A:
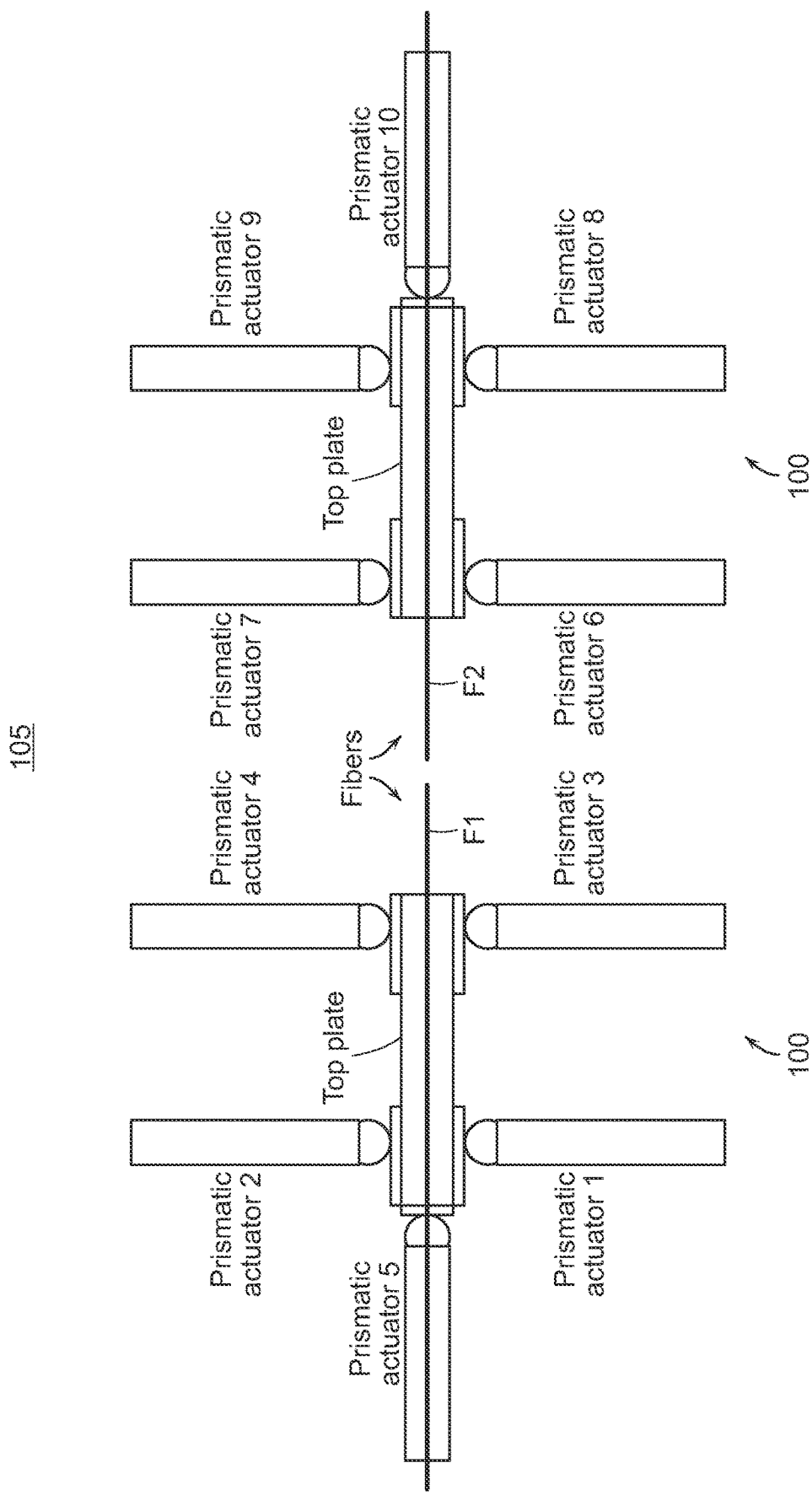
FIG. 17A is a view of an embodiment of a photonic positioner system that employs a four-axis positioning stage, in accordance with principles of inventive concepts.
Figure 17B:
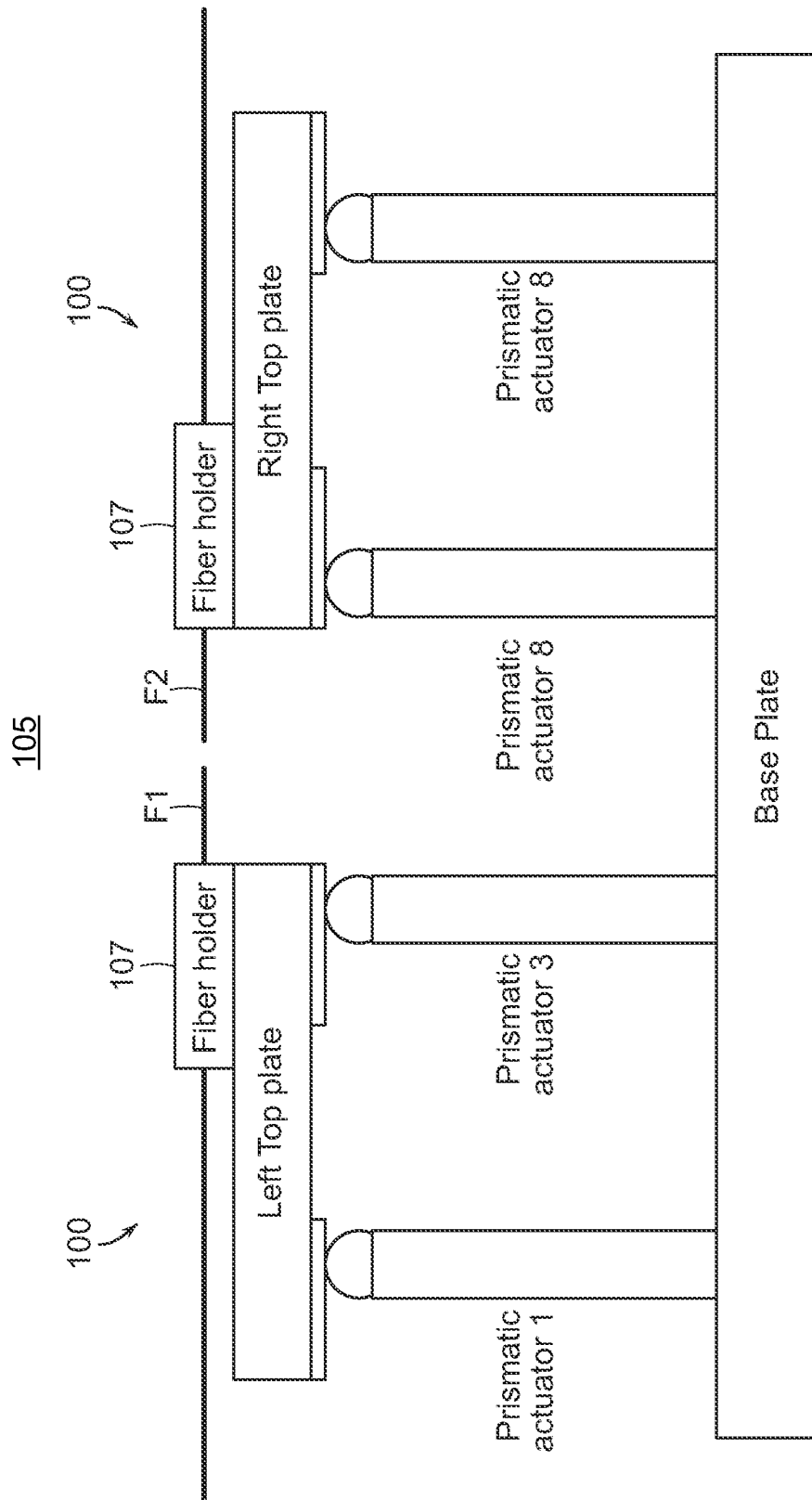
FIG. 17B is a view of the photonic positioner system of FIG. 17A.

FIGS. 17A and 17B are side views of a photonic positioner system 105 that employs positioners in accordance with principles of inventive concepts. In this example embodiment a pair of positioners 100 each support an optical fiber end F1, F2 for splicing. Each of the positioners 100 may be manipulated, as previously described, for example, using an electronic controller 103 to align the ends of fibers F1, F2 for splicing by an optical fiber slicer including a heating element, such as a plasma heater (not shown), that is configured to heat the fiber ends once aligned using positioners 100. In example embodiments the top plates of positioners 100 may include or support fiber holders 107. Such fiber holders are known and may include grooves in an otherwise flat top surface for holding one or more fibers in place for positioning and splicing.

Referring to FIGS. 18-27, alternative embodiments of a multi-axis positioner or positioning stage are described, in accordance with aspects of the inventive concepts. Unless otherwise noted, the description above similarly applies to these embodiments or aspects thereof. As above, a multi-axis positioner, also referred to herein as a parallel positioner or positioning stage, may employ a plurality of actuators forming a plurality of joints with a support plate. In these embodiments, the plurality of joints includes at least two four-degree-of-freedom (4 DOF) joints in combination with two other joints, where each of the other joints can be a 4 DOF joint or a 5 DOF joint. In various embodiments, the positioner includes two 4 DOF joints and either two 5 DOF joints, one 4 DOF joint and one 5 DOF joint, or two 4 DOF joints. Therefore, the interface between the positioning end of an actuator and the support plate is a 4 DOF or a 5 DOF joint. Other embodiments can include different combinations of 4 DOF and/or 5 DOF joints with the support plate. The support plate can be configured to support an object or objects to be positioned, preferably with a high degree of accuracy.

In various embodiments, the system includes three or more actuators that maintain contact with the structure through a joint having four or five degrees of freedom (DOF). And, optionally, the system can contain no actuators that maintain contact with the structure through a joint having 3 or less DOF.

In example embodiments, the positioner can also include at least one bottom plate (or structure) and the actuators can be disposed between the at least one bottom plate and the top plate, and fixed to the at least one bottom plate (or structure).

In operation, when one or more of the actuators extends or contracts, pivot points at the interfaces of the remaining actuators with the support plate (e.g., the 4DOF and/or 5DOF joints) are allowed to shift in any of at least four axes, other than that actuator's axis of motion. As previously indicated, 4 DOF joints with the support plate may be formed by an actuator having an end comprising an edge slider or a cylindrical slider, as examples. In preferred embodiments, as with the 5 DOF joint embodiments discussed above, at least two of the prismatic actuators can be perpendicular to at least two other prismatic actuators and, if a fifth or sixth axis is added, their associated prismatic actuators may be arranged perpendicular to the other four prismatic actuators, in various embodiments.

As with the 5 DOF embodiments discussed above, the ends of the actuators can be magnetically coupled to the support (or top) plate. In operation, when one or more of the actuators extends or contracts, the pivot points of the remaining actuators are allowed to shift and move with respect to the top plate, while remaining magnetically, movably coupled to the support (or top) plate.

As above, in example embodiments, the actuators may be any of several types, such as: piezo actuators, manual micrometer screws, magnetic actuators, stepper motors with linear actuators (either integral or separate), hydraulic cylinders, pneumatic cylinders, or rotary motors with eccentric cams, for example. In example embodiments in accordance with principles of inventive concepts, the positioner is configured such that the push and pull forces exerted by each actuator is greater than the shear friction of all the other actuators combined. In example embodiments, this can be accomplished by employing materials that have a high holding force, but a relatively low shear force, for example, such as a hard metal end surface of the actuators magnetically held in contact with a hard, flat metal surface of the top plate.

FIGS. 18-27 provide views of example embodiments of a multi-axis positioner, or positioning stage, that employ at least two actuators having a cylindrical slider end to form 4 DOF joints with a support plate, in accordance with principles of inventive concepts. The positioner can include 2 or more actuators engaging the support plate that have 4 or 5 DOF joints therewith.

The support plate can be configured to hold an object to be positioned. In some embodiments, the object can be at least one optical fiber. In some embodiments, the support plate can include a groove or channel configured to maintain the object in a preferred position. In some embodiments, the support plate can include a V-shaped groove configured to maintain the object in a preferred position. In some embodiments, the positioner or positioning stage can form part of a fiber processing machine, such as an optical fiber splicer, as an example, and the groove can be configured to hold or support at least one optical fiber.

Figure 18:
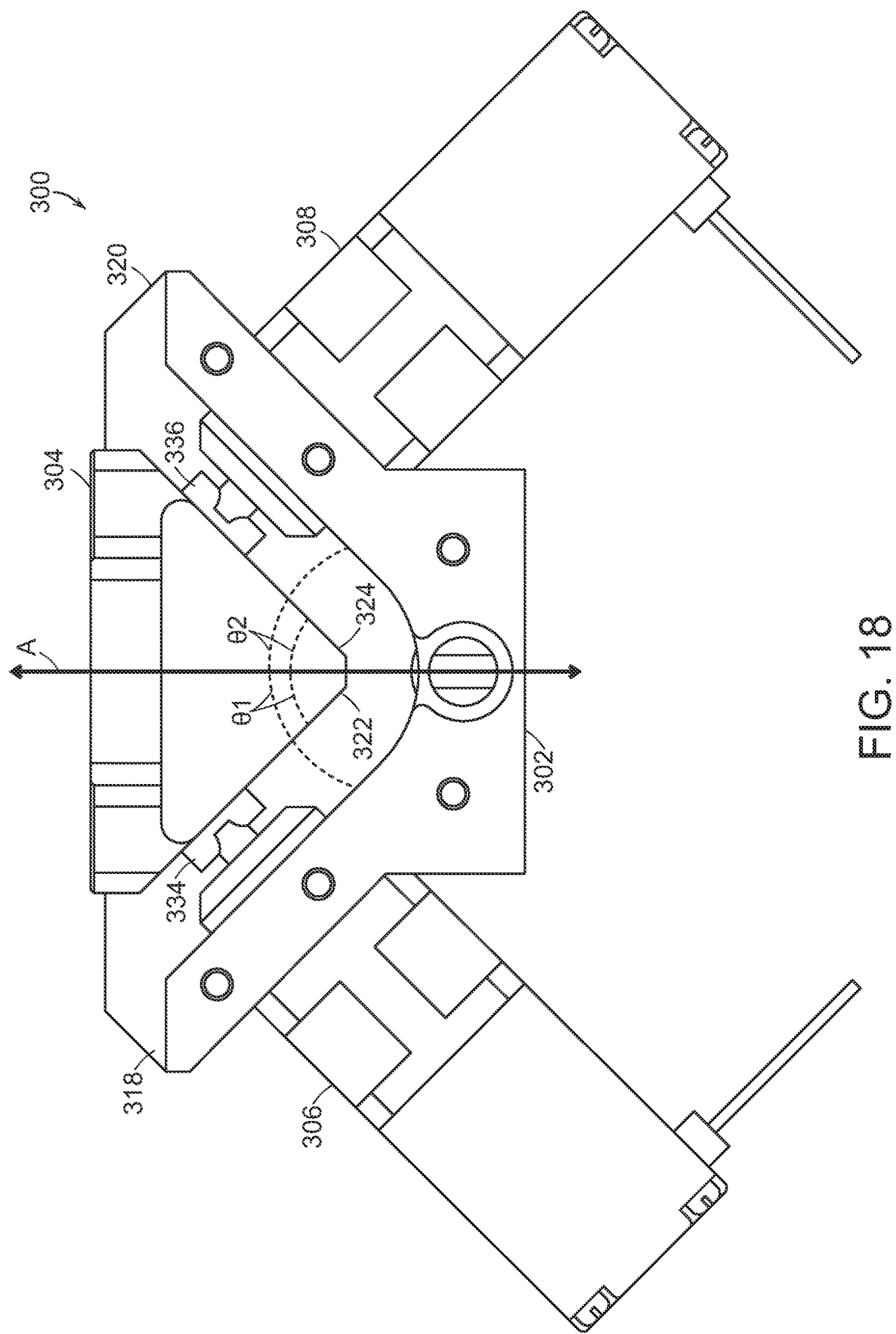
FIG. 18 is a front, end view of another embodiment of a multi-axis positioning stage, in accordance with aspects of the inventive concepts.

FIG. 18 shows a front, end view of embodiment of a multi-axis positioning stage, or positioner, 300 having at least four actuators 306, 308, 310, 312 supporting a support (or top) plate 304. A first actuator 306 and a second actuator 308 are visible in this view, but a third actuator 310 (not shown) is behind the first actuator 306 and a fourth actuator 312 (not shown) is behind the second actuator 308.

With respect to FIG. 18, all actuators are retracted in this view. In this example embodiment, the positioning stage 300 includes a base plate 302, the top plate 304, and the plurality of actuators 306, 308, 310, 312, one or more of which can be a prismatic actuator. In various embodiments, the positioning stage 300, or the base plate thereof, can optionally include an end plate 317, as discussed with respect to FIGS. 23 and 24 below.

In example embodiments, similar to the embodiments discussed above, the baseplate 302 includes side pieces 318, 320 having interior angled sides that are each formed at an angle with respect to a vertical axis or plane "A," e.g., see $\theta_1$ and $\theta_2$ discussed above, which can apply to this embodiment. For instance, the vertical plane A can be a plane running vertically the length of the center of the top plate 304 and base plate 302. In other embodiments, it may be possible for $\theta_1 \neq \theta_2$. Sides 322, 324 of top plate 304 are formed at the same angle to the vertical axis or plane A. Therefore, the side piece 318 of the base plate 302 is parallel to the side 322 of the top plate 304 and the side piece 320 of the base plate is parallel to side 324 of the top plate 304. In the embodiment of FIG. 18, the base plate 302 includes an intermediate portion from which the side pieces 318 and 320 extend. The intermediate portion can be a substantially planar piece that lies in the horizontal plane, but the intermediate portion need not be planar or flat in all embodiments and may include a concave portion, as an example, as shown in FIG. 18.

In this embodiment, each of the actuators 306, 308, 310, and 312 extends from one of the side pieces 318, 320 of the base plate 302, in a direction toward the top plate 304. For example, in this embodiment, each actuator is secured or coupled to a side piece of the base plate 302 and is oriented at an angle of 90 degrees with respect to a corresponding actuator on the opposite side piece 318 or 320.

A distal end of each actuator 306, 308, 310, and 312 may include a magnetic material. In the embodiment of FIGS. 18-24, each of the actuators 306, 308, 310, and 312 includes a ferrous metal cylindrical end 334, 336, 338 and 340, but other linear ends could be used in other embodiments. Magnets, such as magnets 126, 128, 130, and 132 described above, can be disposed on or in the sides 322, 324 of the top plate 304 in locations corresponding to the ferrous metal cylindrical ends 334, 336, 338, and 340 of respective actuators 306, 308, 310, and 312.

Figure 19:
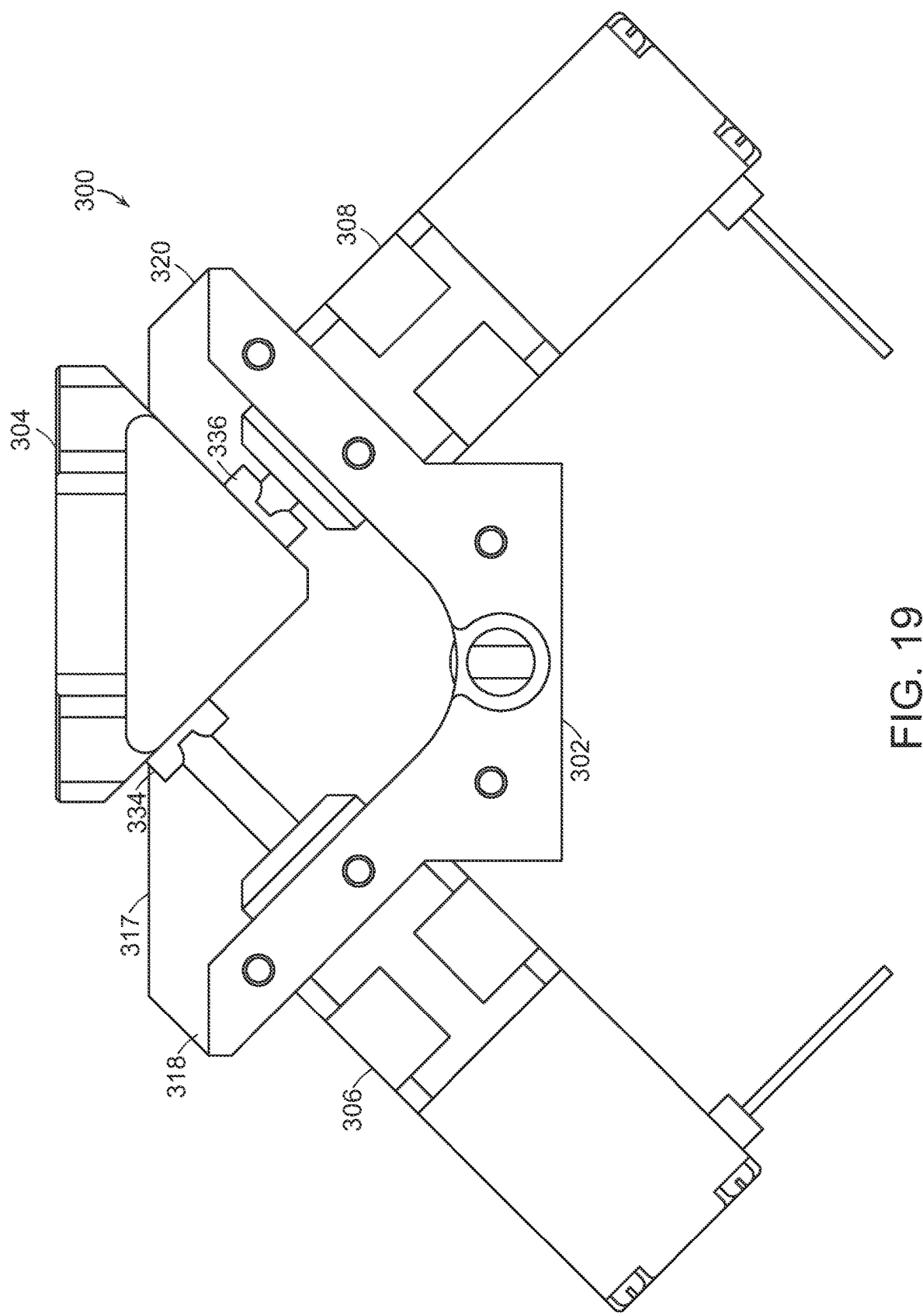
FIG. 19 is a front, end view of the multi-axis positioning stage of FIG. 18 with the first and third actuators extended.

FIG. 19 shows the same front, end view of the positioning stage 300 of FIG. 18, with the first actuator 306 and third actuator (behind the first actuator) extended along an axis ("X AXIS"). The second actuator 308 and the fourth actuator (behind the second actuator) remain retracted (or unextended). In FIG. 19, the first actuator 306 and the third actuator 310 are extended to move the top plate 304 in the direction of the X axis, as indicated by the X-AXIS arrow (see FIG. 3). In example embodiments, the first actuator 306 and the third actuator 310 are extended the same amount in order to provide purely X axis movement.

Figure 20:
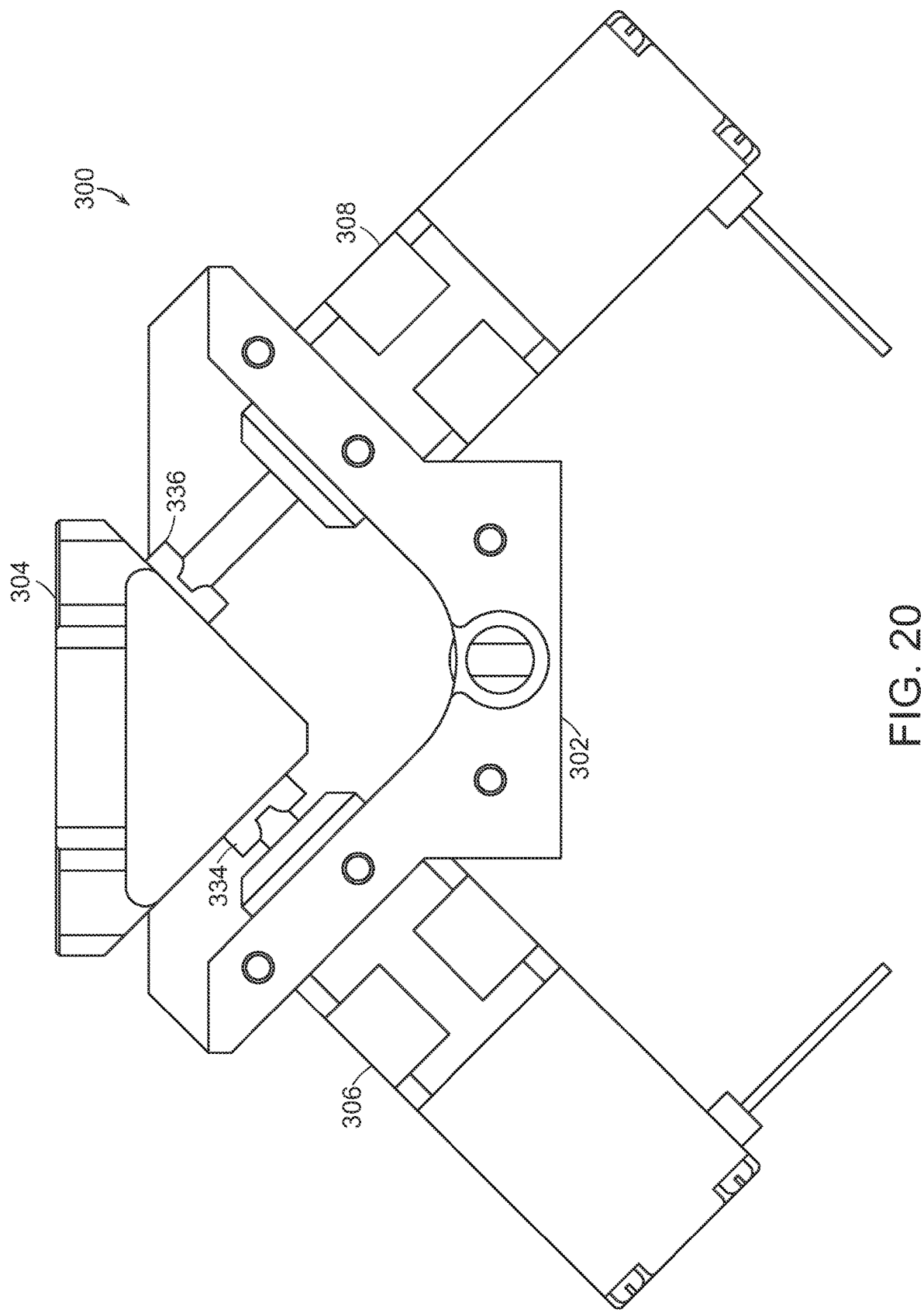
FIG. 20 is a front, end view of the multi-axis positioning stage of FIG. 18 with the second and fourth actuators extended.

FIG. 20 shows the same front, end view of the positioning stage 300 of FIG. 18, with the second actuator 308 and the fourth actuator (behind the second actuator) extended along an axis ("Y AXIS"). The first actuator 306 and the third actuator (behind the first actuator) remain retracted (or unextended). In FIG. 20, the second actuator 308 and the fourth actuator 312 are extended to move the top plate 304 in the direction of the Y axis, as indicated by the Y-AXIS arrow (see FIG. 4). In example embodiments, the second actuator 308 and the fourth actuator 312 are extended the same amount in order to provide purely Y axis movement.

Figure 21:
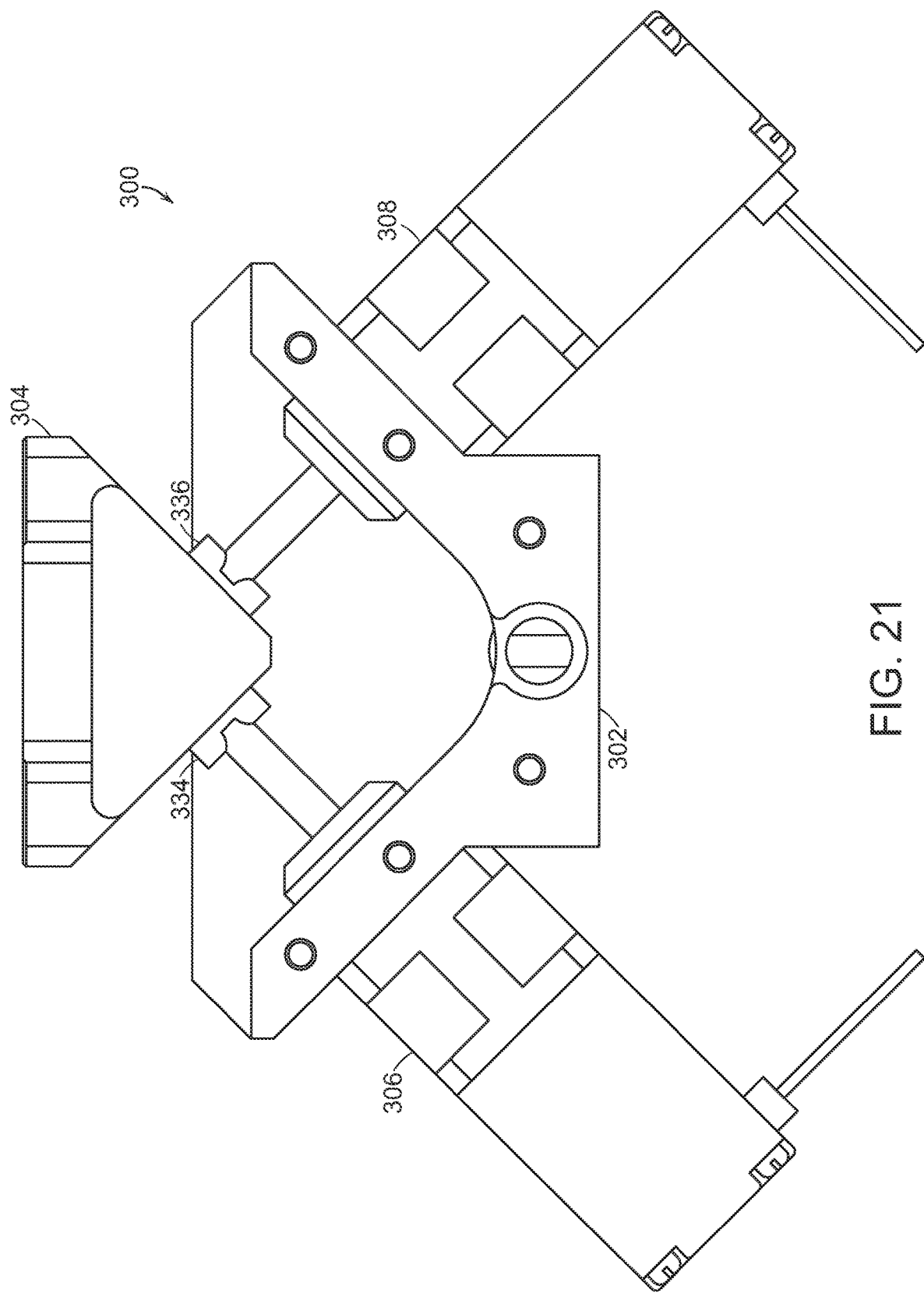
FIG. 21 is a front, end view of the multi-axis positioning stage of FIG. 18 with the first, second, third, and fourth actuators extended.

FIG. 21 shows the same front, end view with all actuators extended the same amount in order to provide movement in the Z direction. In FIG. 21, actuators 306 and 310 (X axis) and actuators 308 and 312 (Y axis) are extended. As previously indicated, the third actuator 310 is behind the first actuator 306 and the fourth actuator 312 is behind the second actuator 308. In example embodiments, the first actuator 306 and the third actuator 310 are extended the same amount in order to provide X axis movement and second actuators 308 and fourth actuator 312 are extended the same amount in order to provide Y axis movement.

Figure 22:
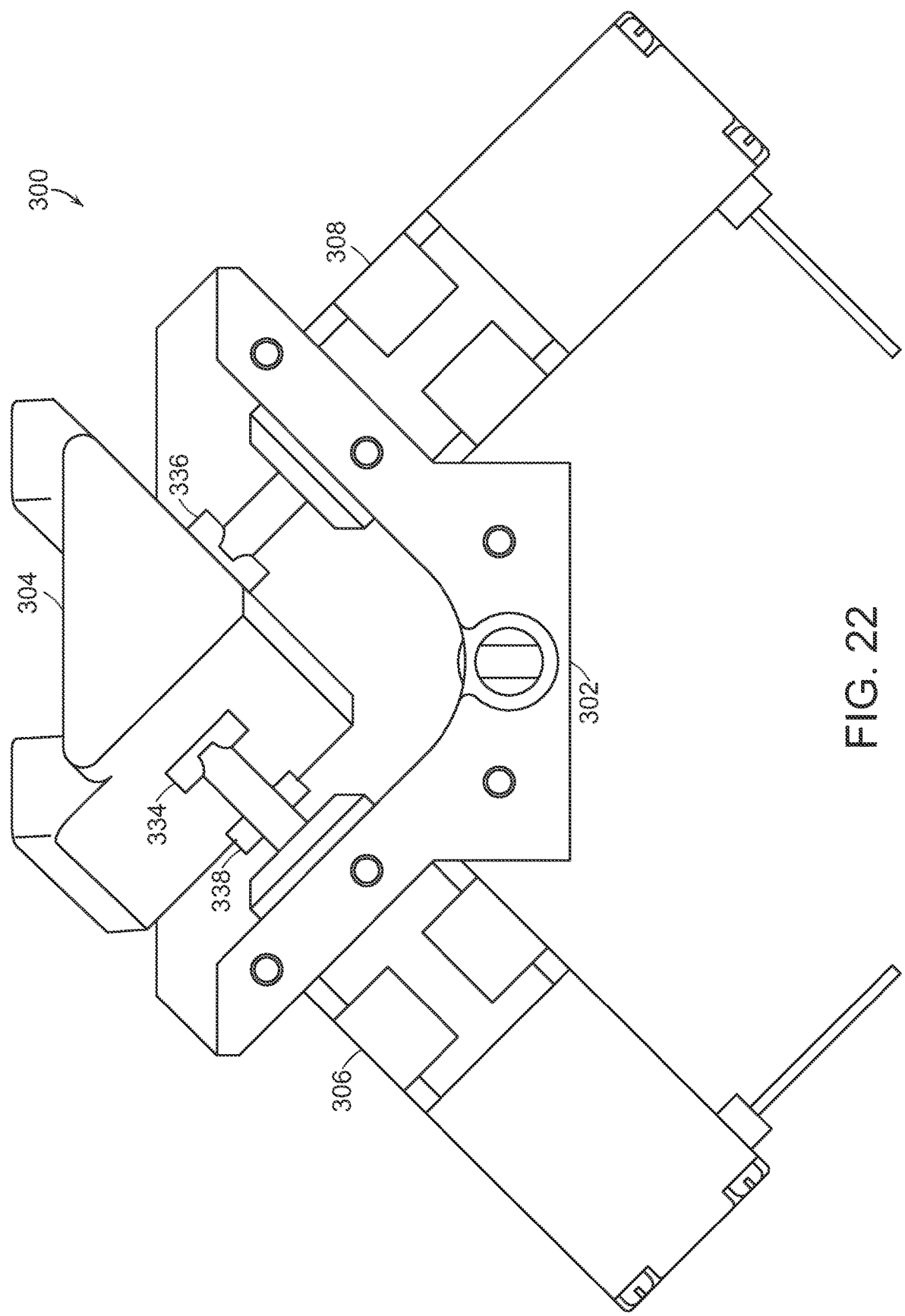
FIG. 22 is a front, end view of the multi-axis positioning stage of FIG. 18 with the top plate tilted.

FIG. 22 shows a left perspective view of the positioning stage 300 of FIG. 18, with the first actuator 306 extended a greater distance than the third actuator 310 and the second actuator 308 similarly extended a greater distance than the fourth actuator 312, resulting in an upward slant of the top plate 304.

Similarly, the third actuator 310 could be extended a greater distance than the first actuator 306 and the fourth actuator 312 could be similarly extended a greater distance than the second actuator 308, resulting in a downward slant of the top plate 304.

Figure 23:
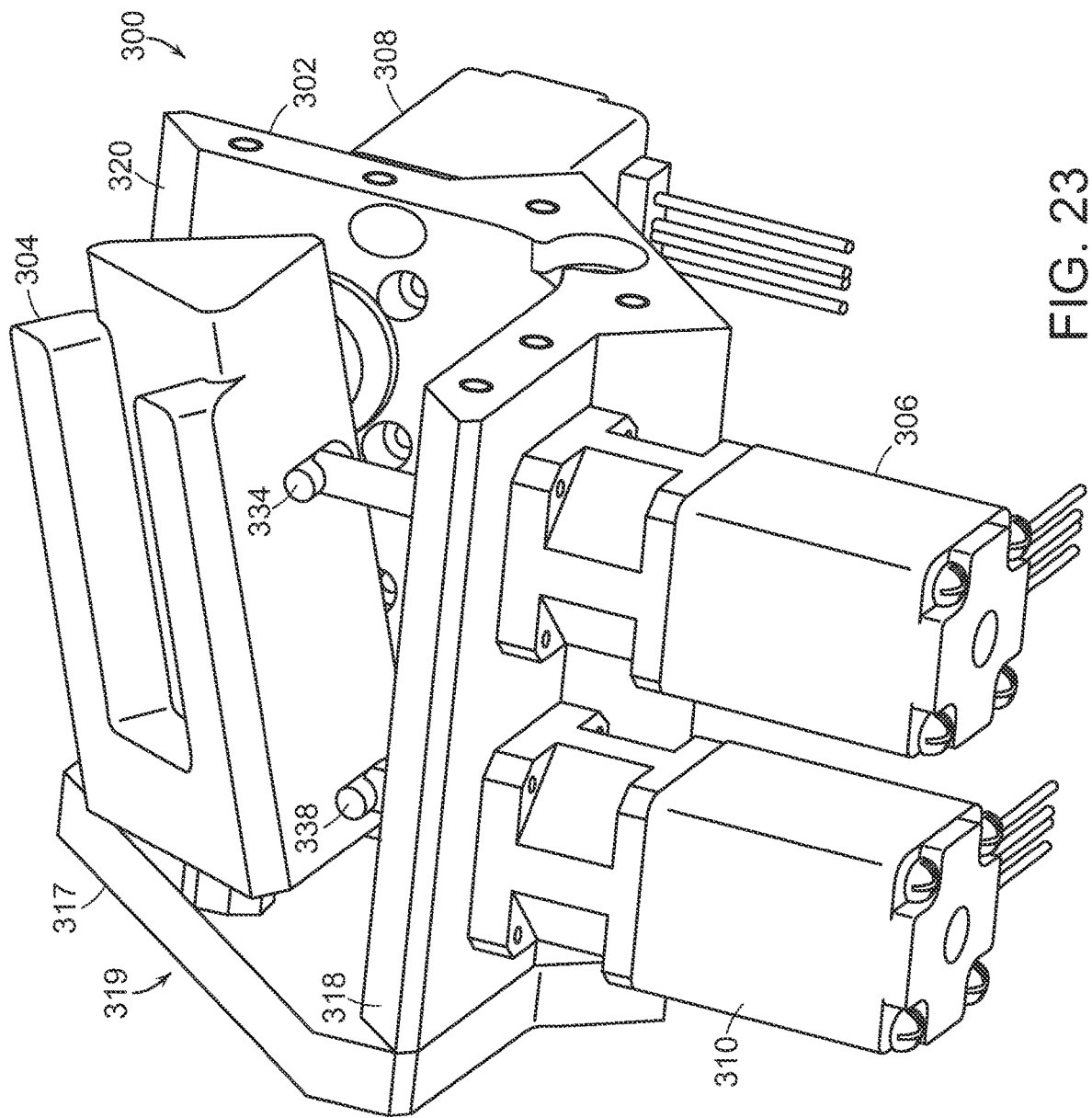
FIG. 23 is a perspective view of the multi-axis positioning stage of FIG. 18 with the top plate tilted.

FIG. 23 illustrates a side perspective view with the first actuator 306 extended more than the third actuator 310 and the fourth actuator 312 extended more than the second actuator 308, creating both an upward tilt and a partial rotation of the top plate 304. In FIG. 23, the end plate 317 is partially visible. The end plate can be secured to or part of the base plate 302, as shown. In other embodiments, the end plate 317 need not contact or be part of the based plate. That is, in various embodiments, the end plate 317 and be detached and/or independent of the base plate 302.

Figure 24:
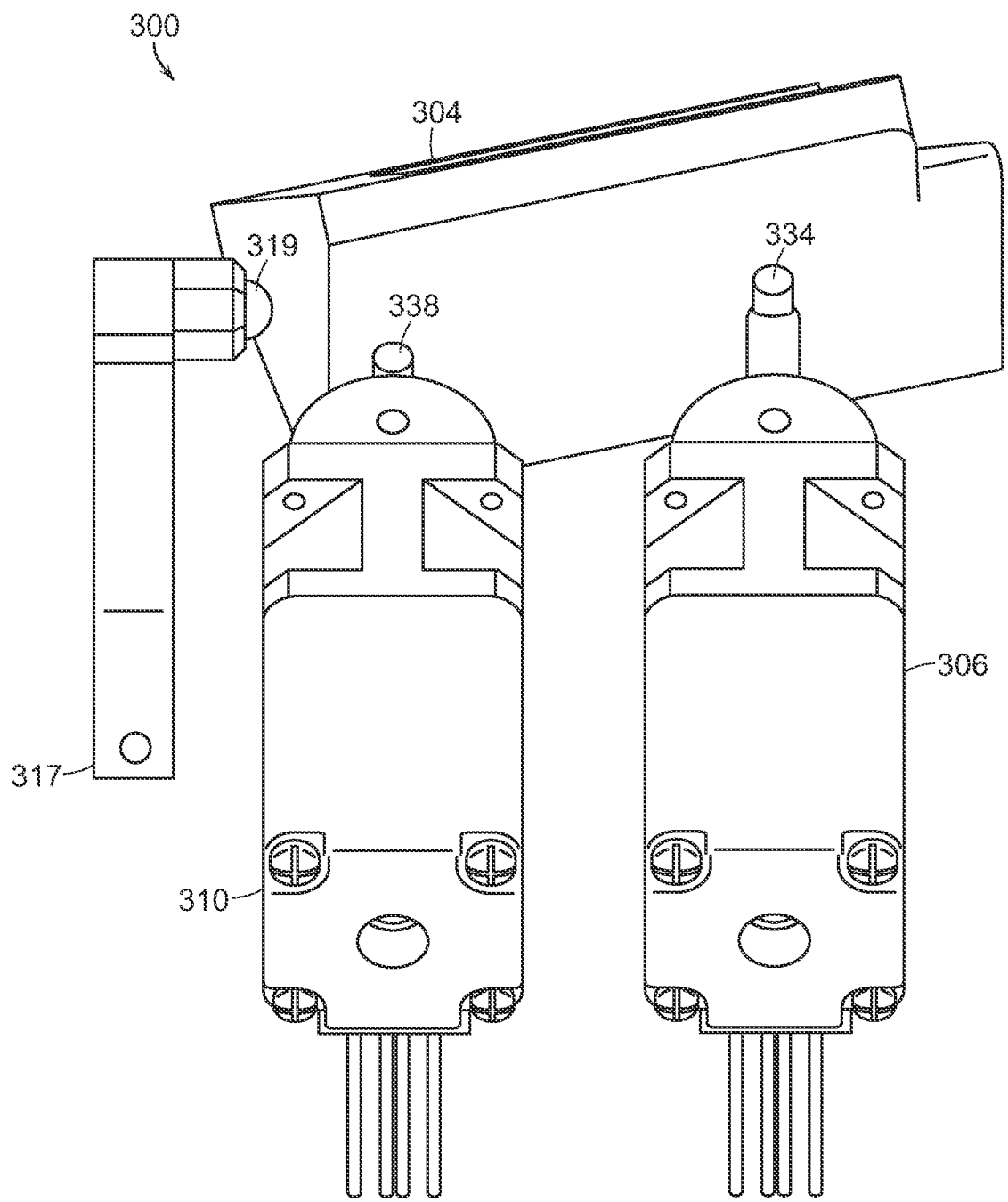
FIG. 24 is a side view of the multi-axis positioning stage of FIG. 18 with the top plate tilted.

FIG. 24 illustrates a side view of the positioning stage 300 with the baseplate omitted, but the top plate 304 shown. Of the four actuators 306, 308, 310, and 312, only the first and third actuators 306, 310 are visible from this view. The cylindrical end 334 of the first actuator and the cylindrical end 338 of the third actuator 310 are in direct contact with top (or support) plate 304 for direct positioning. The end plate 317 includes a magnetic ball 319 for engagement with one end of top plate 304. As with previously described joints, in various embodiments, the magnetic ball 319 may be positioned to engage with a magnet (not shown) located on or in top plate 304.

Figure 25:
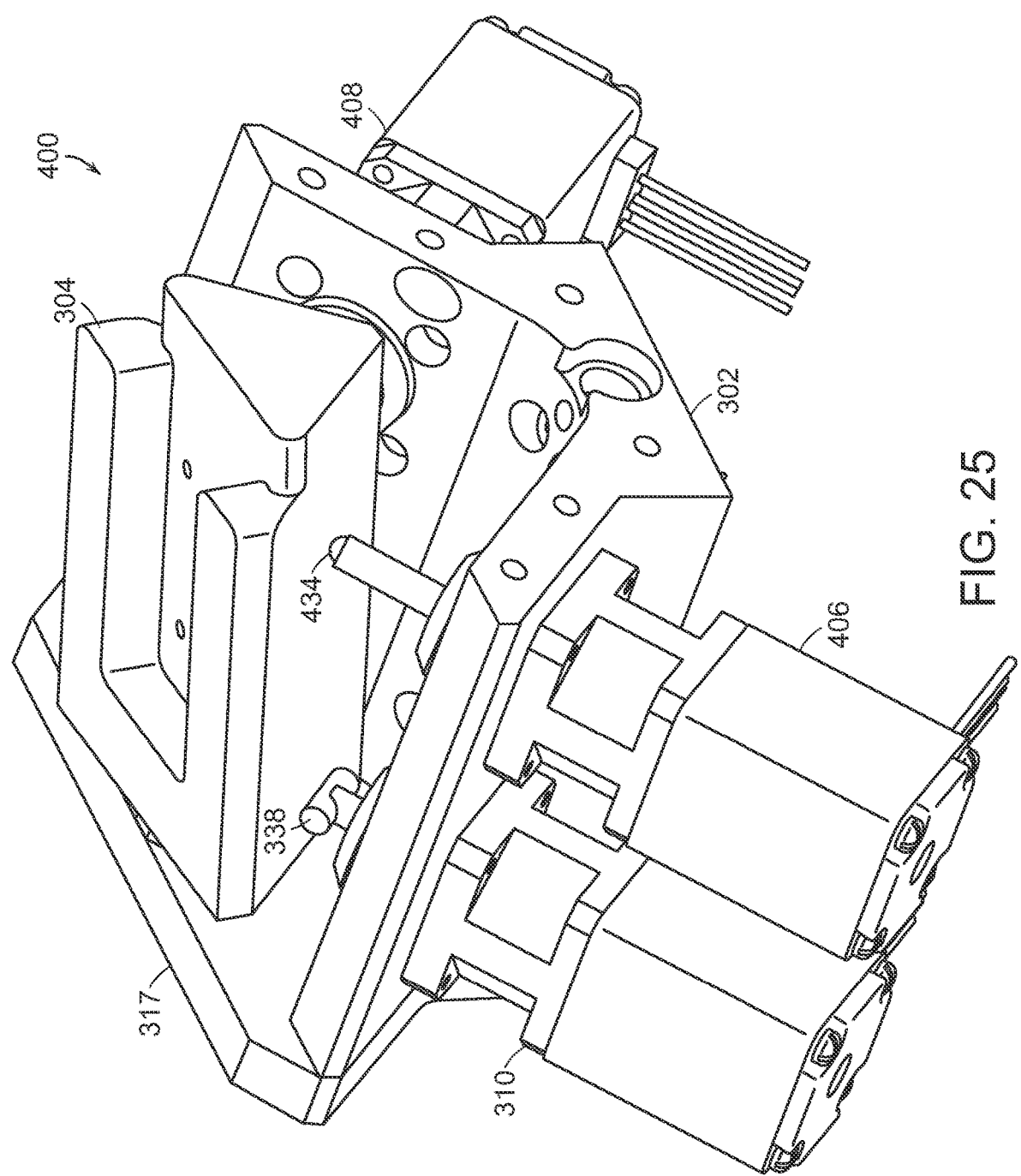
FIG. 25 is a perspective view of another embodiment of a multi-axis positioning stage, in accordance with aspects of the inventive concepts.
Figure 26:
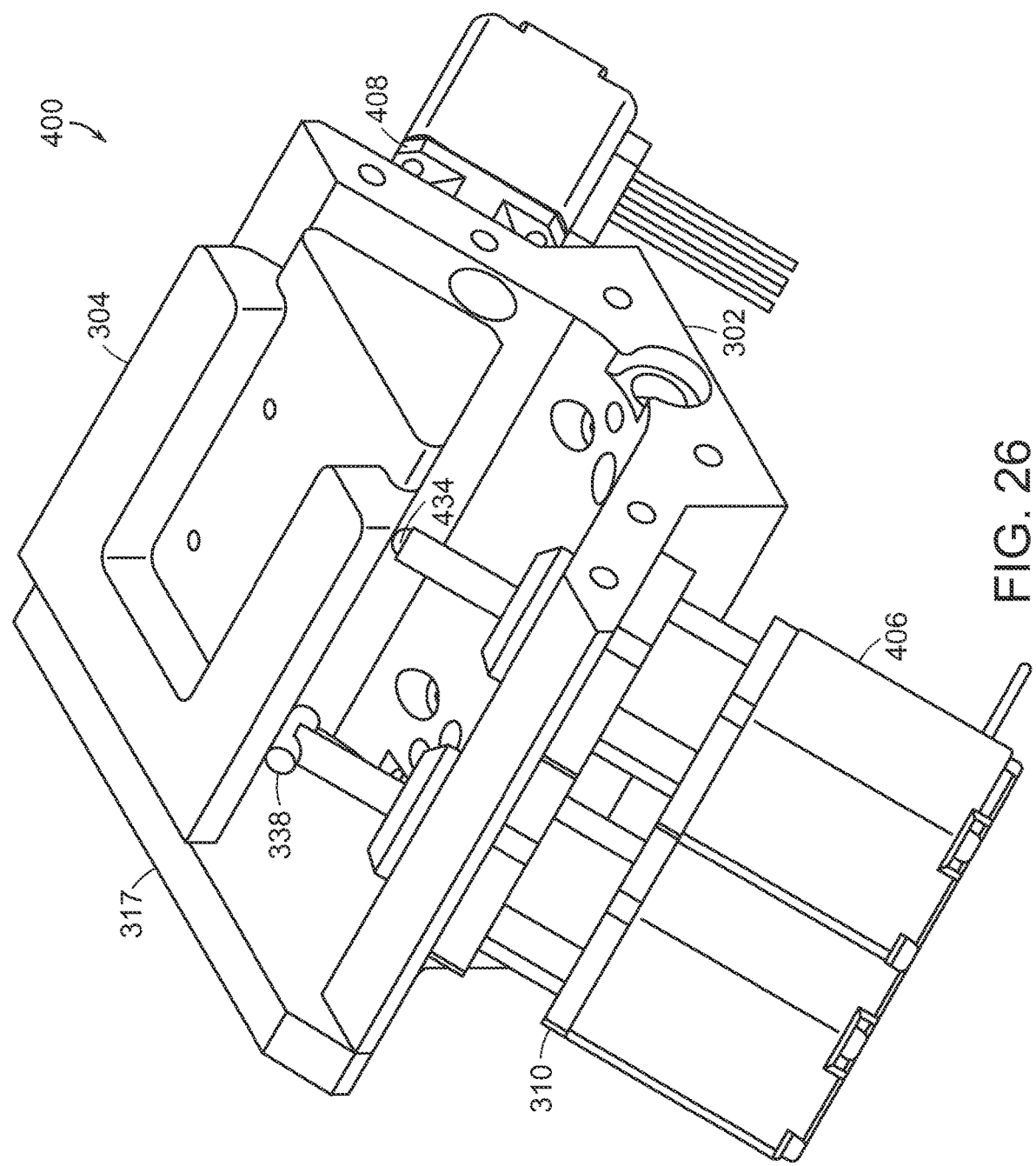
FIG. 26 is a perspective view of the multi-axis positioning stage of FIG. 25 with the first and third actuators extended.
Figure 27:
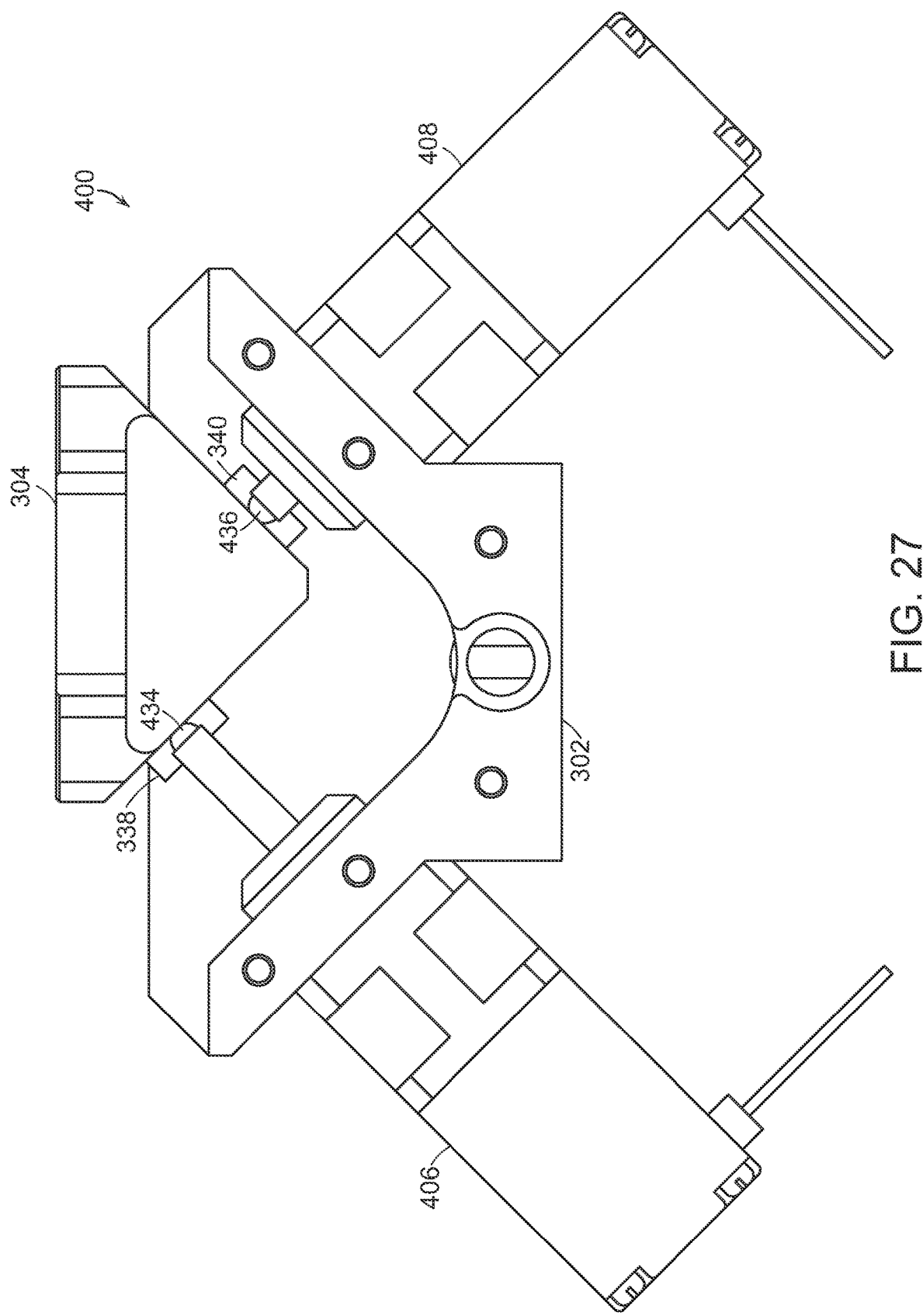
FIG. 27 is a front, end view of the multi-axis positioning stage of FIG. 25 with the first and third actuators extended.

Although, the embodiments of FIGS. 18-24 are illustrated with four actuators having sliding cylinder ends forming 4 DOF joints with the top plate, combinations of 4DOF and 5DOF actuators, as described above, are contemplated within the scope of inventive concepts, as illustrated in the example embodiments of FIGS. 25-27, having a combination of actuators with cylindrical and ball ends, as previously described.

In the embodiment of FIG. 25, a multi-axis positioning stage or positioner 400 is shown. The positioning stage 400 includes two 4 DOF actuators 310, 312 and two 5 DOF actuators 406, 408, as well as baseplate 302, top plate 304, and end plate 317 with magnetic ball 319.

While any combination of actuator extensions and retractions can be accomplished, in this example, the first and second actuators 406, 408 are extended a greater distance than the third and fourth actuators 310, 312, resulting in an upward tilt at the front of top plate 304.

FIG. 26 is a perspective view of the positioning stage 400 with the first actuator 406 and third actuator 410 extended the same amount, resulting in X axis movement of top plate 404. FIG. 26 is a front view of the positioning stage 400 of FIG. 25, with the same actuator extension arrangement. FIG. 27 shows a front, end view of the same actuator configuration, as an example. Those skilled in the art, having the benefit of this disclosure, will appreciate that other combinations of extension and retraction of actuators can be accomplished within the scope of the inventive concepts. In this embodiment, each actuator includes an electro-mechanical component, forming part of the actuator, that drives the extension and retraction of the actuator, which can be controlled by at least one controller, such as controller 103. Such controller can include at least one processor executing computer instructions to drive the actuators.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A positioner, comprising:
a structure;
at least one base;
a plurality of actuators configured to support the structure over the at least one base and to move the structure relative to the at least one base in response to extension or retraction of one or more actuators,
wherein:
three or more of the actuators maintains contact with the structure through a joint having at least four degrees of freedom (DOF).

2. The positioner of claim 1, wherein the three or more actuators includes at least two actuators that maintain contact with the structure through a joint having five DOF.

3. The positioner of claim 2, wherein the three or more actuators includes at least two actuators that maintain contact with the structure through a joint having four DOF.

4. The positioner of claim 1, wherein the three or more actuators includes at least two actuators that maintain contact with the structure through a joint having four DOF.

5. The positioner of claim 1, wherein at least one joint having four DOF is a magnetic joint.

6. The positioner of claim 1, wherein at least one joint having five DOF is a magnetic joint.

7. The positioner of claim 1, wherein each of the three or more actuators has a magnetic joint with the structure.

8. The positioner of claim 1, wherein an actuator having a 4 DOF joint with the structure has a cylindrical end that contacts the structure.

9. The positioner of claim 1, wherein an actuator having a 5 DOF joint with the structure has a hemispherical end that contacts the structure.

10. The positioner of claim 1, wherein the structure includes a lengthwise groove, depression, or channel.

11. The positioner of claim 10, wherein the lengthwise groove, depression, or channel is configured to hold at least one optical fiber.

12. The positioner of claim 10, wherein the structure includes a V-groove configured to hold at least one optical fiber.

13. The positioner of claim 1, wherein:
the structure comprises a top plate and the at least one base includes at least one base plate, and
the three or more actuators that support the top plate are coupled to the at least one base plate.

14. The positioner of claim 13, wherein the top plate includes angled sides engaged by the three or more actuators and the at least one base plate includes angle side pieces to which the three or more actuators is coupled and the angled sides of the top plate and the angled side pieces of the at least one base plate have the same angle with respect to a vertical plane or axis.

15. The positioner of claim 1, further comprising an end plate including a coupling to an end of the structure.

16. The positioner of claim 15, wherein the coupling is a magnetic coupling.

17. A positioner, comprising:
a top plate;
a baseplate; and
three or more actuators configured to support the top plate over the baseplate and to move the top plate in response to extension or retraction of one or more actuators, wherein each of the actuators maintains contact with the top plate through a joint having at least four degrees of freedom (DOF).

18. The positioner of claim 17, wherein the three or more actuators includes at least two actuators that maintain contact with the top plate through a joint having four DOF and at least one actuator that maintains contact with the top plate though a joint having five DOF.

19. The positioner of claim 17, wherein the top plate includes angled sides engaged by the three or more actuators and the base plate includes angle side pieces to which the three or more actuators are coupled and the angled sides of the top plate and the angled side pieces of the base plate have the same angle with respect to a vertical plane or axis.

20. The positioner of claim 17, wherein the actuators having a 4 DOF joint with the top plate have a cylindrical end.

* * * * *